US008431884B2

(12) United States Patent  
Grier

(10) Patent No.: US 8,431,884 B2
(45) Date of Patent: Apr. 30, 2013

(54) HOLOGRAPHIC MICROFABRICATION AND CHARACTERIZATION SYSTEM FOR SOFT MATTER AND BIOLOGICAL SYSTEMS

(75) Inventor: David G. Grier, New York, NY (US)

(73) Assignee: New York University, New York, NY (US)

(*) Notice: Subject to any disclaimer, the term of this patent is extended or adjusted under 35 U.S.C. 154(b) by 69 days.

(21) Appl. No.: 12/928,178

(22) Filed: Dec. 6, 2010

(65) Prior Publication Data

US 2011/0114831 A1     May 19, 2011

Related U.S. Application Data

(62) Division of application No. 11/936,033, filed on Nov. 6, 2007, now Pat. No. 7,847,238.

(60) Provisional application No. 60/857,348, filed on Nov. 7, 2006.

(51) Int. Cl.
*H01S 3/10*     (2006.01)

(52) U.S. Cl.
USPC ............................................. 250/251

(58) Field of Classification Search ........... 250/251
See application file for complete search history.

(56) References Cited

U.S. PATENT DOCUMENTS

| 4,649,026 A | 3/1987 | Postle et al. |
|---|---|---|
| 5,245,466 A | 9/1993 | Burns et al. |
| 5,939,716 A | 8/1999 | Neal |
| 5,989,813 A | 11/1999 | Gerdes |
| 6,055,106 A | 4/2000 | Grier et al. |
| 6,294,063 B1 | 9/2001 | Becker et al. |
| 6,475,639 B2 | 11/2002 | Shahinpoor et al. |
| 6,605,453 B2 | 8/2003 | Ozkan et al. |
| 6,624,940 B1 | 9/2003 | Grier et al. |
| 6,639,208 B2 | 10/2003 | Grier et al. |
| 6,737,634 B2 | 5/2004 | Curtis et al. |
| 6,797,942 B2 | 9/2004 | Grier et al. |
| 6,815,664 B2 | 11/2004 | Wang et al. |
| 6,847,032 B2 | 1/2005 | Grier et al. |
| 6,850,363 B1 * | 2/2005 | Wendenburg et al. ........ 359/385 |
| 6,858,833 B2 | 2/2005 | Curtis et al. |
| 7,033,415 B2 | 4/2006 | Mirkin et al. |
| 7,173,711 B2 | 2/2007 | Dholakia et al. |

(Continued)

FOREIGN PATENT DOCUMENTS

CN    1 519 199 A    8/2004
EP    0 517 454 A2    12/1992

(Continued)

OTHER PUBLICATIONS

Grier ("A revolution in optical manipulation" Nature, vol. 424, Aug. 14, 2003, pp. 810-816).*

(Continued)

*Primary Examiner* — Michael Maskell
(74) *Attorney, Agent, or Firm* — Foley & Lardner LLP

(57) ABSTRACT

A method and system for micromanipulation of objects of any shape. The method and system creates various forms of holographic optical traps for a variety of commercial purposes. Some alternate forms of traps include a dark form of optical traps, optical vortices with different helical winding numbers and optical traps with variable phase profiles imprinted thereon.

20 Claims, 10 Drawing Sheets

U.S. PATENT DOCUMENTS

| | | | |
|---|---|---|---|
| 7,482,577 B2 * | 1/2009 | Gruber et al. | 250/251 |
| 7,491,928 B2 * | 2/2009 | Roichman et al. | 250/251 |
| 2002/0108859 A1 | 8/2002 | Wang et al. | |
| 2002/0132316 A1 | 9/2002 | Wang et al. | |
| 2003/0007894 A1 | 1/2003 | Wang et al. | |
| 2003/0032204 A1 | 2/2003 | Walt et al. | |
| 2003/0132373 A1 | 7/2003 | Curtis et al. | |
| 2004/0180363 A1 * | 9/2004 | Gruber et al. | 435/6 |
| 2004/0207922 A1 * | 10/2004 | Grier et al. | 359/614 |
| 2004/0234264 A1 | 11/2004 | Sasaki et al. | |
| 2005/0001063 A1 | 1/2005 | Grier et al. | |
| 2005/0017161 A1 * | 1/2005 | Grier et al. | 250/251 |
| 2005/0037397 A1 | 2/2005 | Mirkin et al. | |
| 2005/0058352 A1 | 3/2005 | Deliwala | |
| 2005/0094232 A1 | 5/2005 | Kibar | |
| 2005/0100351 A1 | 5/2005 | Yuan et al. | |
| 2005/0164372 A1 | 7/2005 | Kibar | |
| 2005/0173622 A1 * | 8/2005 | Curtis et al. | 250/222.2 |
| 2005/0176134 A1 * | 8/2005 | Grier et al. | 435/287.2 |
| 2005/0221333 A1 | 10/2005 | Sundararajan et al. | |
| 2005/0259914 A1 | 11/2005 | Padgett et al. | |
| 2006/0040286 A1 | 2/2006 | Mirkin et al. | |
| 2006/0131494 A1 * | 6/2006 | Grier et al. | 250/251 |
| 2007/0023622 A1 * | 2/2007 | Grier et al. | 250/251 |
| 2008/0094675 A1 * | 4/2008 | Roichman et al. | 359/15 |
| 2008/0137161 A1 * | 6/2008 | Roichman et al. | 359/15 |
| 2009/0027747 A1 * | 1/2009 | Lee et al. | 359/15 |

FOREIGN PATENT DOCUMENTS

| | | |
|---|---|---|
| GB | 2 408 587 A | 6/2005 |
| JP | 6-225750 A | 8/1994 |
| WO | WO 98/04740 A1 | 2/1998 |
| WO | WO 01/35150 A | 5/2001 |
| WO | WO 02/17362 A2 | 2/2002 |
| WO | WO 02/056431 A2 | 7/2002 |
| WO | WO 2004/012133 A2 | 2/2004 |
| WO | WO 2004/100175 A | 11/2004 |
| WO | WO 2005/114151 A1 | 12/2005 |

OTHER PUBLICATIONS

Agarwal, et al., "Manipulation and Assembly of Nanowires with Holographic Optical Traps," *Optics Express*, Oct. 2005, pp. 8906-8912. vol. 13, No. 22, Optical Society of America, USA.

Allen, et al., "Orbital Angular Momentum of Light and the Transformation of Laguerre-Gaussian Laser Modes", Jun. 1992, vol. 45, No. 11, pp. 8185-8190, *The American Physical Society*, USA.

Arlt, et al., "Generation of a Beam with a Dark Focus Surrounded by Regions of Higher Intensity: The Optical Bottle Beam", *Optics Letters*, Feb. 15, 2000, pp. 191-193, vol. 25, No. 4, Optical Society of America, USA.

Arlt, et al., "Optical Micromanipulation Using a Bessel Light Beam", *Optics Communications*, vol. 197, Oct. 1, 2001, pp. 239-245, Elsevier Science B.V., The United Kingdom.

Arrizon, et al., "Accurate Encoding of Arbitrary Complex Fields with Amplitude-Only Liquid Crystal Spatial Light Modulators", *Optical Express*, Oct. 3, 2005, pp. 7913-7927, vol. 13, No. 20, Optical Society of America, USA.

Ashkin, A., "Optical Trapping and Manipulation of Neutral Particles Using Lasers." *Proc. Nat. Acad. Sci.*, May 1997, pp. 4853-4860, vol. 94, PNAS, USA.

Ashkin, A., "History of Optical Trapping and Manipulation of Small-Neutral Particle, Atoms, and Molecules", *IEEE Journal on Selected Topics in Quantum Electronics*, Nov./Dec. 2000, pp. 841-856, vol. 6, No. 6, USA.

Ashkin, A., "Laser Manipulation of Atoms", *Nature*, Dec. 17, 1987, pp. 608-609, vol. 330, Nature Publishing Group, USA.

Ashkin, A., "Optical Trapping and Manipulation of Single Cells Using Infrared Laser Beams." *Nature*, Dec. 24/31, 1987, pp. 769-771, vol. 330, Nature Publishing Group, USA.

Ashkin, et al., "Observation of a Single-Beam Gradient Force Optical Trap for Dielectric Particles", *Optical Letters*, May 1986, pp. 288-290, vol. 11, No. 5, Optical Society of America, USA.

Ashkin, et al., "Optical Trapping and Manipulation of Single Living Cells Using Infra-Red Laser Beams." *Ber Bunsenges. Phys. Chem.*, (1989), pp. 254-260, vol. 93, VCH Verlagsgesellschaft mbH, Germany.

Ashkin, et al., Force Generation of Organelle Transport Measured in vivo by an Infrared Laser Trap, *Nature*, Nov. 22, 1990, pp. 346-348, vol. 348, Nature Publishing Group, USA.

Behrens, et al., "Pair Interaction of Charged Colloidal Spheres Near a Charged Wall." *Phys. Rev. E*, (2001), pp. 050401-1-050401-4, vol. 64, USA.

Behrens, et al., "The Charge of Glass and Silica Surfaces." *J. Chem. Phys.* Oct. 8, 2001, pp. 6716-6721, vol. 115, No. 14, American Institute of Physics, USA.

Behrens, et al., "Measuring a Colloidal Particle's Interaction with a Flat Surface Under Nonequilibrium Conditions." *Euro. Phys. J. E*, Apr. 16, 2003, pp. 115-121, vol. 10, EDP Sciences, Springer-Verlag.

Bengtsson, J., "Kinoforms Designed to Produce Different Fan-Out Patterns for Two Wavelengths", *Applied Optics*, Apr. 10, 1998, pp. 2011-2020, vol. 37, No. 11, Optical Society of America.

Berg, et al., "A Miniature Flow Cell Designed for Rapid Exchange of Media Under High-Power Microscope Objectives." *Journal of General Microbiology*, (1984) pp. 2915-2920, vol. 130, Printed in Great Britain.

Berns, M. W., "Laser Scissors and Tweezers." *Sci. Am.*, Apr. 1998, pp. 62-67, vol. 278.

Biancaniello et al., "Colloidal Interactions and Self-Assembly Using DNA Hybridization", *Physical Review Letters*, Feb. 11, 2005, pp. 058302-1-058302-4, vol. 94, The American Physical Society.

Block, et al., "Compliance of Bacterial Flagella Measured With Optical Tweezers." *Nature* (1989) pp. 514-518, vol. 338, Nature Publishing Group.

Bonin et al., "Light Torque Nanocontrol, Nanomotors, and Nanorockers," *Optics Express Opt. Soc. America USA*, Sep. 23, 2002, vol. 10, No. 19, USA.

Born et al., "Principles of Optics—Electromagnetic Theory of Propagation, Interference and Diffraction of Light", Seventh (Expanded) Edition, *Cambridge University Press*, 1999.

Campbell et al., "Fabrication of Photonic Crystals for the Visible Spectrum by Holographic Lithography." *Macmillan Magazines, Ltd.*, (2000) pp. 53-56.

Chan, C. T., "Quasicrystals Enter Third Dimension" *Nature Photonics*, Feb. 2007, pp. 91-92, vol. 1, Nature Publishing Group.

Chiou et al., "Interferometric Optical Tweezers", *Optics Communications*, Jan. 1, 1997, pp. 7-10, vol. 133, Elsevier Science B.V.

Cohn et al., "Approximating Fully Complex Spatial Modulation with Pseudorandom Phase-Only Modulation", Jul. 10, 1994, pp. 4406-4415, vol. 33, No. 20, Optical Society of America.

Cojoc, D., et al., "Laser Trapping and Micro-Manipulation using Optical Vortices", *Microelectronic Engineering*, vol. 78-79, Mar. 2005, pp. 125-131, Elsevier Netherlands.

Courtial, et al., "Observation of the Rotational Frequency Shift for Light with Intrinsic and Orbital Angular Momentum", *Quantum Electronics Conference—IQEC 98. Technical Digest*, May 3-8, 1998, pp. 139-140, USA.

Crocker et al., "Interactions and Dynamics in Charge-Stabilized Colloid." *MRS Bull.*, (1998), pp. 24-31, vol. 23, USA.

Crocker et al., "Entropic Attraction and Repulsion in Binary Colloids Probed with a Line Optical Tweezer", *Physical Review Letters*, May 24, 1999, pp. 4352-4355, vol. 82, No. 21, The American Physical Society.

Crocker, et al., "Methods of Digital Video Microscopy for Colloidal Studies," *Journal of Colloid and Interface Science*, (1996), pp. 298-310, vol. 179, USA.

Crocker, et al., "Microscoptic Measurement of the Pair Interaction Potential of Charge-Stabilized Colloid," *Physical Review Letters*, Jul. 1994, vol. 73, No. 2, pp. 352-355, USA.

Curtis et al., "Dynamic Holographic Optical Tweezers", *Optics Communications*, Jun. 15, 2002, pp. 169-175, vol. 207, Elsevier Science B.V., USA.

Curtis et al., "Modulated Optical Vortices", Jun. 1, 2003, pp. 872-874, vol. 28, No. 11, *Optics Letters*, Optics Society of America.

Curtis, et al., "Structure of Optical Vortices", *Physical Review Letters*, Apr. 4, 2003, pp. 133901-1-133901-4, vol. 90, No. 13, The American Physical Society.

Davis et al., "Encoding Amplitude Information onto Phase-Only Filters", *Applied Optics*, Aug. 10, 1999, pp. 5004-5013, vol. 38, No. 23, Optical Society of America.

Davis et al., "Encoding Amplitude and Phase Information onto a Binary Phase-Only Spatial Light Modulator", *Applied Optics*, Apr. 10, 2003, pp. 2003-2008, vol. 42, No. 11, Optical Society of America.

Denis et al., "Direct Extraction of the Mean Particle Size from a Digital Hologram", *Applied Optics*, Feb. 10, 2006, pp. 944-952, vol. 45, No. 5, Optical Society of America.

Deubel, et al., "Direct Laser Writing of Three-Dimensional Photonic-Crystal Templates for Telecommunications", *Nature Materials*, Jul. 2004, pp. 444-447, vol. 3, Nature Publishing Group.

Doskolovich, et al., "Design of DOEs for Wavelength Division and Focusing", *Journal of Modern Optics*, Apr. 15, 2005, pp. 917-926, vol. 52, No. 6, Taylor & Francis.

Duffy, D. C., et al., "Rapid Prototyping of Microfluidic Systems in Poly(Dimethylsiloxane)." *Anal. Chem.*, Dec. 1, 1998, pp. 4974-4984, vol. 70, No. 23, USA.

Dufresne, et al., "Brownian Dynamics of a Sphere Between Parallel Walls", *Europhysics Letters*, Jan. 15, 2001, pp. 264-270, vol. 53, No. 2, EDP Sciences.

Dufresne, et al., "Computer-Generated Holographic Optical Tweezer Arrays." *Rev. Sci. Instr.*, Mar. 2001, pp. 1810-1816, vol. 72, No. 3, American Inst. of Physics, USA.

Dufresne, et al., "Erratum: Interactions, Dynamics, and Elasticity in Charge-Stabilized Colloidal Crystals", *J Chem. Phys.* May 1, 1999, pp. 8845-8845, vol. 110, No. 17, American Inst. of Physics, USA.

Dufresne, et al., "Hydrodynamic Coupling of Two Brownian Spheres to a Planar Surface." *Phys. Rev. Lett.*, Oct. 9, 2000, pp. 3317-3320, vol. 85, No. 15, The American Physical Society, USA.

Dufresne, et al., "Optical Tweezer Arrays and Optical Substrates Created with Diffractive Optics", *Review of Scientific Instruments*, May 1998, pp. 1974-1977, vol. 69, No. 5, American Institute of Physics.

Eriksen, et al., "Fully Dynamic Multiple-Beam Optical Tweezers," *Optics Express*, Jul. 15, 2002, pp. 597-602, vol. 10, No. 14, Optical Society of America, USA.

Escuti et al., "Holographic Photonic Crystals", *Optical Engineering*, Sep. 2004, pp. 1973-1987, vol. 43, No. 9, Society of Photo-Optical Instrumentation Engineers.

Faucheux et al., "Optical Thermal Ratchet", *Physical Review Letters*, Feb. 27, 1995, pp. 1504-1507, vol. 74, No. 9, The American Physical Society.

Faucheux et al., "Periodic Forcing of a Brownian Particle", *Physical Review E*, Jun. 1995, pp. 5239-5250, vol. 51, No. 6, The American Physical Society.

Felgner, et al., "Calibration of Light Forces in Optical Tweezers", *Appl. Opt.*, Feb. 20, 1995, pp. 977-982, vol. 34, No. 6, Optical Society of America, USA.

Finer et al., "Characterization of Single Actin-Myosin Interactions." *Biophys. J.*, Apr. 1995, pp. 291s-297s, vol. 68, Biophysical Society.

Florin, et al., "High-Resolution Axial and Lateral Position Sensing Using Two-Photon Excitation of Fluorophores by a Continuous-Wave Nd:YAG Laser." *Appl. Phys. Lett.*, Jul. 22, 1996, pp. 446-448, vol. 69, No. 4, American Inst. of Physics, USA.

Gahagan et al., "Optical Vortex Trapping of Particles", *Optics Letters*, Jun. 1, 1996, pp. 827-829, vol. 21, No. 11, Optics Society of America, USA.

Gahagan et al., "Simultaneous Trapping of Low-Index and High-Index Microparticles Observed with an Optical-Vortex Trap", *J. Opt. Soc. Am. B*, Apr. 1999, pp. 533-537, vol. 16, No. 4, Optical Society of America, USA.

Gahagan et al., "Trapping of Low-Index Microparticles in an Optical Vortex", *J. Opt. Soc. Am. B*, Feb. 1998, pp. 524-534, vol. 15, No. 2, Optical Society of America, USA.

Ghislain et al., "Measurement of Small Forces Using an Optical Trap", *Rev. Sci. Instrum.*, Sep. 1994, pp. 2762-2768, vol. 65, No. 9, American Inst. of Physics, USA.

Gibson et al., "Free-Space Information Transfer Using Light Beams Carrying Orbital Angular Momentum", *Optics Express*, Nov. 1, 2004, pp. 5448-5456, vol. 12, No. 22, USA.

Gittes et al., "Interference Model for Back-Focal-Plane Displacement Detection in Optical Tweezers" *Optics Letters*, Jan. 1, 1998, pp. 7-9, vol. 23, No. 1, Optical Society of America, USA.

Glückstad et al., "Reconfigurable Ternary-Phase Array Illuminator Based on the Generalised Phase Contrast Method" *Opt. Comm.*, Jan. 1, 2000, pp. 169-175, vol. 173, Elsevier Science B.V.

Goodman, J. W., "Introduction to Fourier Optics", Second Edition, McGraw-Hill, 1996, New York.

Gopinathan, et al., "Statistically Locked-In Transport Through Periodic Potential Landscapes", *Phys. Rev. Lett.*, Apr. 2, 2004, pp. 130602-1-130602-4, USA.

Gopinathan, et al., "Weak Long-Ranged Casimir Attraction in Colloidal Crystals." *Europhys. Lett.*, Feb. 1, 2002, pp. 451-457, vol. 57, No. 3, EDP Sciences.

Grier, D. G., "A Revolution in Optical Manipulation", *Nature*, Aug. 14, 2003, pp. 810-816, vol. 424, Nature Publishing Group.

Grier, D. G., "Colloids: A Surprisingly Attractive Couple", *Nature*, Jun. 18, 1998, pp. 621-623, vol. 393, Macmillan Publishers Ltd.

Grier, D. G., "Optical Tweezers in Colloid and Interface Science", *Cur. Opin. Colloid Interface Sci.*, Feb. 5, 1997, pp. 264-270, vol. 2, USA.

Grier, D. G., "When Like Charges Attract: Interactions and Dynamics in Charge-Stabilized Colloidal Suspensions", *J Phys.: Condens. Matter*, (2000), pp. A85-A94, vol. 12.

Grier, et al., "Anomalous Attractions in Confined Charge-Stabilized Colloid." *J. Phys.: Condens. Matt.*, Apr. 10, 2004, pp. S4145-S4157, vol. 16.

Grier, et al., "Comment on Monte Carlo Study of Structural Ordering in Charged Colloids Using a Long-Range Attractive Potential", *Phys. Rev. E*, Jan. 2000, pp. 980-982, vol. 61, No. 1, The American Physical Society, USA.

Grier, et al., "Holographic Optical Trapping" *Appl. Opt.*, Feb. 10, 2006, pp. 880-887, vol. 45, issue 5, Optical Society of America, USA.

Grier, et al., "Interactions in Colloidal Suspensions: Electrostatics, Hydrodynamics and their Interplay" In "Electrostatic Effects in Biophysics and Soft Matter," C. Holm et al. (eds), *Electrostatuc Effects in Soft Matter and Biophysics*, (2001), pp. 87-116, Kluwer Academic Publishers, The Netherlands.

Guck et al., "Stretching Biological Cells with Light", *J. Phys.: Condens. Matter*, (2002) pp. 4843-4856, vol. 14, IOP Publishing Ltd., UK.

Guerrero-Viramontes et al., "3D Particle Positioning from CCD Images Using the Generalized Lorenz-Mie and Huygens-Fresnel Theories", *Meas. Sci. Technol.*, (2006) pp. 2328-2334, vol. 17, IOP Publishing Ltd., United Kingdom.

Guidoni et al., "Quasiperiodic Optical Lattices", *Physical Review Letters*, Nov. 3, 1997, pp. 3363-3366, vol. 79, No. 18, The American Physical Society, USA.

Guo, et al., "Optimal Annulus Structures of Optical Vortices", *Optics Express*, Sep. 20, 2004, pp. 4625-4634, vol. 12, No. 19, USA.

Han, et al., "Colloidal Electroconvection in a Thin Horizontal Cell: II. Bulk Electroconvection of Water During Parallel-Plate Electrolysis", *J. Chem. Phys.*, (2006), pp. 144707-1-144707-9, vol. 125, No. 14, American Inst. Of Physics, USA.

Han, et al., "Colloidal Electroconvection in a Thin Horizontal Cell I. Microscopic Cooperative Patterns at Low Voltage." *J. Chem. Phys.*, Apr. 22, 2005, pp. 164701-1-164701-11, vol. 122, No. 16, American Inst. of Physics, USA.

Han, et al., "Configurational Temperature of Charge-Stabilized Colloidal Monolayers" *Phys. Rev. Lett.*, Apr. 9, 2004, pp. 148301-1-148301-4, USA.

Han, et al., "Configurational Temperatures and Interactions in Charge-Stabilized Colloid", *J. Chem. Phys.*, (2005), pp. 064907-1-064907-14, American Inst. of Physics, USA.

Han, et al., "Confinement-Induced Colloidal Attractions in Equilibrium" *Phys. Rev. Lett.*, Jul. 18, 2003, pp. 038302-1-038302-4, The American Physical Society, USA.

Han, et al., "Vortex Rings in a Constant Electric Field", *Nature*, Jul. 17, 2003, pp. 267-268, vol. 424, Nature Publishing Group.

Harrison, et al., "Micromachining a Miniaturized Capillary Electrophoresis-Based Chemical-Analysis System on a Chip", *Science*, Aug. 13, 1993, pp. 895-897, vol. 261, USA.

He, et al., "Direct Observation of Transfer of Angular Momentum to Absorptive Particles from a Laser Beam with a Phase Singularity", Jul. 31, 1995, pp. 826-829, vol. 75, No. 5, *Physical Review Letters*, The American Physical Society.

He, et al., "Optical Particle Trapping with Higher-Order Doughnut Beams Produced Using High Efficiency Computer Generated Holograms", *Journal of Modern Optics*, 1995, pp. 217-223, vol. 42, No. 1, Taylor & Francis Ltd.

Heckenberg, N. R., "Laser Beams With Phase Singularities", *Opt. Quantum Elect.*, Sep. 1992, pp. S951-S962, vol. 24, No. 9, Chapman & Hall, USA.

Huang et al., "Optical Tweezers as Sub-Pico-Newton Force Transducers", *Optics Communication*, Aug. 1, 2001, pp. 41-48, vol. 195, Elsevier Science B.V.

Igasaki et al., "High Efficiency Electrically-Addressable Phase-Only Spatial Light Modulator", *Opt. Rev.*, (1999), pp. 339-344, vol. 6, No. 4, Japan.

Jerri, A. J., "The Gibbs Phenomenon in Fourier Analysis, Splines and Wavelet Approximations" *Kluwer Academic Publishers*, (1998), pp. vii-ix.

Joannopoulos et al., "Photonic Crystals: Putting a New Twist on Light", *Nature*, Mar. 13, 1997, pp. 143-149, vol. 386, Nature Publishing Group.

Kaliteevski et al., "Two-Dimensional Penrose-Tiled Photonic Quasicrystals: Diffraction of Light and Fractal Density of Modes", *Journal of Modern Optics*, pp. 1771-1778, 2000, vol. 47, No. 11, Taylor & Francis, Ltd., UK.

Knöner, et al., "Measurement of the Index of Refraction of Single Microparticles", *Phys. Rev. Lett.*, 2006, pp. 157402-1-157402-4, vol. 97, The American Physical Society.

Korda, et al., "Evolution of a Colloidal Critical State in an Optical Pinning Potential." *Phys. Rev. B*, (2002), pp. 024504-1-024504-7, vol. 66, The American Physical Society, USA.

Korda, et al., "Kinetically Locked-In Colloidal Transport in an Array of Optical Tweezers", *Phys. Rev. Lett.*, Sep. 16, 2002, pp. 128301-1 0 128301-4, vol. 89, No. 12, The American Physical Society, USA.

Korda, et al., "Nanofabrication With Holographic Optical Tweezers" *Rev. Sci. Instr.*, Apr. 2002, pp. 1956-1957, vol. 73, No. 4, American Institute of Physics.

Koss et al., "Optical Peristalsis" *Appl. Phys. Lett.*, Jun. 2, 2003, pp. 3985-3987, vol. 82, No. 22, American Institute of Physics.

Kuo, et al., "Force of Single Kinesin Molecules Measured with Optical Tweezers", *Science*, Apr. 9, 1993, pp. 232-234, vol. 260, USA.

Ladavac et al., "Colloidal Hydrodynamic Coupling in Concentric Optical Vortices", *Europhysics Letters*, May 15, 2005, pp. 548-554, vol. 70, No. 4, EDP Sciences.

Ladavac et al., "Microoptomechanical Pumps Assembled and Driven by Holographic Optical Vortex Arrays", *Optics Express*, Mar. 22, 2004, pp. 1144-1149, vol. 12, No. 6, Optical Society of America.

Ladavac et al., "Sorting Mesoscopic Objects with Periodic Potential Landscapes: Optical Fractionation", *Physical Review E*, (2004), pp. 010901-1-010901-4, vol. 70, The American Physical Society.

Ledermann et al., "Three-Dimensional Silicon Inverse Photonic Quasicrystals for Infrared Wavelengthgs", Dec. 2006, pp. 942-945, vol. 5, Nature Publishing Group.

Lee et al., "Flux Reversal in a Two-State Symmetric Optical Thermal Ratchet", *Phys. Rev. E*, (2005), pp. 060102-1 0 060102-4, vol. 71, The American Physical Society, USA.

Lee et al., "Giant Colloidal Diffusivity on Corrugated Optical Vortices" *Phys. Rev. Lett.*, May 19, 2006, pp. 190601-1-190601-4, vol. 96, The American Physical Society, USA.

Lee et al., "Holographic Microscopy of Holographically Trapped Three-Dimensional Structures", *Optics Express*, Feb. 19, 2007, pp. 1505-1512, vol. 15, No. 4, Optical Society of America, USA.

Lee et al., "Observation of Flux Reversal in a Symmetric Optical Thermal Ratchet", *Phys. Rev. Lett.*, Mar. 25, 2005, pp. 110601-1-110601-4, vol. 94, The American Physical Society.

Lee et al., "One-Dimensional Optical Thermal Ratchets", *J Phys.: Condens. Matter*, (2005), pp. S3685-S3695, vol. 17, IOP Publishing Ltd., UK.

Lee et al., "Robustness of Holographic Optical Traps Against Phase Scaling Errors," *Optics Express*, Sep. 19, 2005, pp. 7458-7465, vol. 13, No. 19, Optical Society of America, USA.

Lesem et al., "The Kinoform: A New Wavefront Reconstruction Device", *IBM J. Res. Develop.*, Mar. 1969, pp. 150-155, vol. 13, No. 2, Optical Science and Technology.

Levy et al., "Simultaneous Multicolor Image Formation with a Single Diffractive Optical Element", *Optics Letters*, Aug. 1, 2001, pp. 1149-1151, vol. 26, No. 15, Optical Society of America.

Liesener et al., "Multi-Functional Optical Tweezers Using Computer-Generated Holograms," *Optics Communications*, Nov. 2000, vol. 185, pp. 77-82, Elsevier Science B.V.

MacDonald et al., "Microfluidic Sorting in an Optical Lattice", *Nature*, Nov. 27, 2003, vol. 426, pp. 421-313, Nature Publishing Group.

Man, et al., "Experimental Measurement of the Photonic Properties of Icosahedral Quasicrystals" *Nature*, Aug. 18, 2005, vol. 436, pp. 993-996, Nature Publishing Group.

Manz, A., "Miniaturized Total Chemical Analysis Systems: A Novel Concept for Chemical Sensing" *Sens. Actuators B1*, (1990), pp. 244-248, Elsevier Sequoia, The Netherlands.

Martorell et al., "Spontaneous Emission in a Disordered Dielectric Medium" *Phys. Rev. Lett.*, Feb. 18, 1991, pp. 887-890, vol. 66, No. 7, The American Physical Society, USA.

Martorell et al., "Observation of Inhibited Spontaneous Emission in a Periodic Dielectric Structure" *Phys. Rev. Lett.*, Oct. 8, 1990, pp. 1877-1880, vol. 65, No. 15, The American Physical Society, USA.

Megens et al., "Light Sources Inside Photonic Crystals" *J. Opt. Soc. Am. B*, Sep. 1999, pp. 1403-1408, vol. 16, No. 9, Optical Society of America, USA.

Megens et al., "Comment on Spontaneous Emission of Organic Molecules Embedded in a Photonic Crystal" *Phys. Rev. Lett.*, Dec. 20, 1999, p. 5401, vol. 83, No. 25, The American Physical Society, USA.

Megens et al., "Fluorescence Lifetimes and Linewidths of Dye in Photonic Crystals" *Phys. Rev. A*, Jun. 1999, pp. 4727-4731, vol. 59, No. 6, The American Physical Society.

Meiners et al., "Femtonewton Force Spectroscopy of Single Extended DNA Molecules" *Phys. Rev. Lett.*, May 22, 2000, pp. 5014-5017, vol. 84, No. 21, The American Physical Society.

Mogensen, P.C., "Dynamic Array Generation and Pattern Formation for Optical Tweezers" *Opt. Comm.*, (2000), pp. 75-81, vol. 175, Elsevier Science B.V.

Moh et al., "Multiple Optical Line Traps Using a Single Phase-Only Rectangular Ridge", *Applied Physics B, Lasers and Optics*, 2005, pp. 973-976, vol. 80, Springer-Verlag.

Moreno et al., "Particle Positioning from Charge-Coupled Device Images by the Generalized Lorenz-Mie Theory and Comparison with Experiment", *Applied Optics*, Oct. 1, 2000, pp. 5117-5124, vol. 39, No. 28, Optical Society of America.

Mungan et al., "Determining Pair Interactions from Structural Correlations" *Phys. Rev. B*, Dec. 1998, pp. 14 588-14 593, vol. 58, No. 21, The American Physical Society, USA.

Neuman et al., "Characterization of Photodamage to *Escherichia coli* in Optical Traps" *Biophysical Journal*, Nov. 1999, pp. 2856-2863, vol. 77, Biophysical Society.

Neuman et al., "Optical Trapping", *Review of Scientific Instruments*, Sep. 2004, pp. 2787-2809, vol. 75, No. 9, American Institute of Physics.

Park et al., "Fresnel Particle Tracing in Three Dimensions Using Diffraction Phase Microscopy", *Optics Letters*, Apr. 1, 2007, pp. 811-813, vol. 32, No. 7, Optical Society of America.

PCT International Search Report, dated Oct. 23, 2008, International Application No. PCT/US2007/082823, 5 pages.

Pelton et al., "Characterizing Quantum-Dot Blinking using Noise Power Spectra", *Appl. Phys. Lett.*, Aug. 2, 2004, pp. 819-821, vol. 85, No. 5, American Institute of Physics, USA.

Pelton, et al., "Transport and Fractionation in Periodic Potential-Energy Landscapes", *Physical Review E*, 2004, vol. 70, pp. 031108-1-031108-10, The American Physical Society.

Plewa, et al., "Processing Carbon Nanotubes with Holographic Optical Tweezers", *Optics Express Opt. Soc. America USA*, May 3, 2004, pp. 1978-1981, vol. 12, No. 9, USA.

Polin, et al., "Optimized Holographic Optical Traps", *Optics Express*, Jul. 25, 2005, pp. 5831-5845, vol. 13, No. 15, Optical Society of America.

Polin, et al., "Anomalous Vibrational Dispersion in Holographically Trapped Colloidal Arrays", *Phys. Rev. Lett.*, Mar. 3, 2006, pp. 088101-1-088101-4, The American Physical Society, USA.

Polin, et al., "Colloidal Electrostatic Interactions Near a Conducting Surface" *Phys. Rev. E.*, Oct. 2007, pp. 041406-1-041406-7, The American Physical Society, USA.

Pralle, et al., "Three-Dimensional High-Resolution Particle Tracking for Optical Tweezers by Forward Scattered Light", *Microscopy Research and Technique*, 1999, pp. 378-386, vol. 44, Wiley-Liss, Inc.

Pu et al., "Particle Field Characterization by Digital In-Line Holography: 3D Location and Sizing" *Experiments in Fluids*, 2005, pp. 1-9, vol. 39, Springer-Verlag.

Ray et al., "Precision of Light Scattering Techniques for Measuring Optical Parameters of Microspheres", *Applied Optics*, Sep. 20, 1991, pp. 3974-3983, vol. 30, No. 27, Optical Society of America.

Reicherter, et al., "Optical Particle Trapping with Computer-Generated Holograms Written on a Liquid-Crystal Display", *Optics Letters*, May 1, 1999, pp. 608-610, vol. 24, No. 9, Optical Society of America.

Rodrigo et al., "Four-Dimensional Optical Manipulation of Colloidal Particles", *Applied Physics Letters*, (2005), pp. 074103-1-074103-3, vol. 86, American Institute of Physics, USA.

Rodrigo et al., "Interactive Light-Driven and Parallel Manipulation of Inhomogeneous Particles." *Opt. Express*, Dec. 30, 2002, pp. 1550-1556, vol. 10, No. 26, Optical Society of America, USA.

Roichman et al., "Optical Traps with Geometric Aberrations," *Applied Optics*, May 2006, pp. 3425-3429, vol. 45, No. 15, Optical Society of America, USA.

Roichman et al., "Projecting Extended Optical Traps with Shape-Phase Holography", *Optics Letters*, Jun. 1, 2006, pp. 1675-1677, vol. 31, No. 11, Optical Society of America, USA.

Roichman, Y. "Holographic Assembly of Quasicrystalline Photonic Heterostructures", *Optics Express*, Jul. 11, 2005, pp. 5434-5439, vol. 13, No. 14, Optical Society of America, USA.

Roosen et al., "The TEM*$_{01}$ Mode Laser Beam—A Powerful Tool for Optical Levitation of Various Types of Spheres", *Optics Communication*, Sep. 1978, pp. 432-436, vol. 26, No. 3, Elsevier Science B.V.

Sasaki et al., "Pattern Formation and Flow Control of Fine Particles by Laser-Scanning Micromanipulation", *Optics Letters*, Oct. 1, 1991, pp. 1463-1465, vol. 16, No. 19, Optical Society of America, USA.

Schonbrun et al., "3D Interferometric Optical Tweezers Using a Single Spatial Light Modulator", *Optics Express*, May 16, 2005, pp. 3777-3786, vol. 13, No. 10, Optical Society of America, USA.

Seeman et al., "Nucleic Acid Nanostructures: Bottom-Up Control of Geometry on the Nanoscale", *Rep. Prog. Phys.*, (2005), pp. 237-270, vol. 68, IOP Publishing Ltd., United Kingdom.

Seldowitz et al., "Synthesis of Digital Holograms by Direct Binary Search", *Applied Optics*, Jul. 15, 1987, pp. 2788-2798, vol. 26, No. 14, Optical Society of America.

Sheng et al., "Digital Holographic Microscope for Measuring Three-Dimensional Particle Distributions and Motions", *Applied Optics*, Jun. 1, 2006, pp. 3893-3901, vol. 45, No. 16, Optical Society of America.

Simmons et al., "Quantitative Measurements of Force and Displacement Using an Optical Trap." *Biophys. J.*, Apr. 1996, pp. 18-13-1822, vol. 70, The Biophysical Society.

Simpson, N. B., "Optical Tweezers and Optical Spanners with Laguerre-Gaussian Modes", *Journal of Modern Optics*, 1996, pp. 2485-2491, vol. 43, No. 12. Taylor & Francis, Ltd.

Sinclair et al., "Assembly of 3-Dimensional Structures Using Programmable Holographic Optical Tweezers", *Optics Express*, Nov. 1, 2004, pp. 5475-5480, vol. 12, No. 22, Optical Society of America, USA.

Singer et al., "Three-Dimensional Force Calibration of Optical Tweezers", *J. Mod. Opt.*, (2000), pp. 2921-2931, vol. 47, No. 14, Taylor & Francis Ltd.

Smith et al., "Optical-trap Force Transducer that Operates by direct Measurement of Light Momentum", *Methods in Enzymology*, (2003), pp. 134-162, vol. 361, Elsevier Science, USA.

Soulez et al., "Inverse Problem Approach in Particle Digital Holography: Out-of-Field Particle Detection Made Possible", Dec. 2007, pp. 3708-3716, vol. 24, No. 12, Optical Society of America.

Soulez et al., "Inverse-Problem Approach for Particle Digital Holography: Accurate Location Based on Local Optimization", Apr. 2007, pp. 1164-1171, vol. 24, No. 4, Optical Society of America.

Sow et al., "Measurement of the Vortex Pair Interaction Potential in a Type-II Superconductor", *Phys. Rev. Lett.*, Mar. 23, 1998, pp. 2693-2696, vol. 80, No. 12, The American Physical Society, USA.

Sundbeck, S., "Structure and Scaling of Helical Modes of Light", *Optics Letter*, Mar. 1, 2005, pp. 477-479, vol. 30, No. 5, Optical Society of America.

Svoboda et al., "Biological Applications of Optical Forces" *Annu. Rev. Biophys. Biomol. Struct.*, Jun. 1994, pp. 247-285, vol. 23, Annual Reviews, Inc., USA.

Svoboda et al., "Direct Observation of Kinesin Stepping by Optical Trapping Interferometry", *Nature*, Oct. 21, 1993, pp. 721-727, vol. 365, Nature Publishing Group.

Swanson et al., "Diffractive Optical Elements for Use in Infrared Systems", *Optical Engineering*, Jun. 1, 1989, pp. 605-608, vol. 28, No. 6, Society of Photo-Optical Instruc. Eng., USA.

Tam, W. Y., "Icosahedral Quasicrystals by Optical Interference Holography", *Appl. Phys. Lett.*, (2006), pp. 251111-1-251111-3, vol. 89, American Institute of Physics, USA.

Terray et al., "Fabrication of Linear colloidal Structures for Microfluidic Applications", *Applied Physics Letters*, Aug. 26, 2002, pp. 1555-15557, vol. 81, No. 9, American Inst. of Physics, USA.

Thompson, B. J., "Holographic Particle Sizing Techniques", *Journal of Physics E: Scientific Instruments*, 1974, pp. 781-788, vol. 7, Great Britain.

Tong et al., "Fluorescence-Lifetime Measurements in Monodispersed Suspensions of Polystyrene Particles", *J. Opt. Soc. Am. B*, Feb. 1993, pp. 356-359, vol. 10, Optical Society of America, USA.

Unger et al., "Monolithic Microfabricated Valves and Pumps by Multilayer Soft Lithography", *Science*, Apr. 7, 2000, pp. 113-116, vol. 288, www.sciencemag.org.

Valignat et al., "Reversible Self-Assembly and Directed Assembly of DNA-Linked Micrometer-Sized Colloids", *PNAS*, Mar. 22, 2005, pp. 4225-4229, vol. 102, No. 12, The National Academy of Sciences, USA.

Vasara et al., "Realization of General Nondiffracting Beams with Computer-Generated Holograms", *J. Opt. Soc. Am. A*, Nov. 1989, pp. 1748-1754, vol. 6, No. 11, Optical Society of America, USA.

Verma et al., "Attractions Between Hard Colloidal Spheres in Semiflexible Polymer Solutions," *Macromolecules*, 2002, vol. 33, pp. 177-186, American Chemical Society, USA.

Verma et al., "Entropic Colloidal Interactions in Concentrated DNA Solutions ", *Physical Review Letters*, Nov. 2, 1998, pp. 4004-4007, vol. 81, No. 18, The American Physical Society, USA.

Visscher et al., "Construction of Multiple-Beam Optical Traps with nanometer-Resolution Position Sensing." *IEEE Journal of Selected Topics in Quantum Electronics*, Dec. 1996, pp. 1066-1076, vol. 2, No. 4, Publ. of the IEEE Lasers and Electro-Optics Society.

Wang et al., "Dynamic Holographic Optical Tweezers using a Twisted-Nematic Liquid Crystal Display", *Journal of Optics A: Pure Applied Optics*, Aug. 1, 2006, pp. 703-708, vol. 8, No. 8, Institute of Physics Publishing, Bristol. GB.

Weiss et al., "Interactions, Dynamics, and Elasticity in Charge-Stabilized Colloidal Crystals." *J Chem. Phys.* Nov. 15, 1998, pp. 8659-8666. vol. 109, No. 19, American Institute of Physics, USA.

Xu et al., "Icosahedral Quasicrystals for Visible Wavelengths by Optical Interference Holography", *Optics Express*, Apr. 2, 2007, pp. 4287-4295, vol. 15, No. 7, Optical Society of America, USA.

Yin et al., "Transcription Against an Applied Force." *Science*, Dec. 8, 1995, vol. 270, pp. 1653-1657, www.sciencemag.org.

Yu et al., "The Manipulation and Assembly of CuO Nanorods with Line Optical Tweezers", *Nanotechnology*, 2004, pp. 1732-1736, vol. 15, IOP Publishing Ltd. UK.

Zhang et al., "Reconstruction Algorithm for High-Numerical-Aperture Holograms with Diffraction-Limited Resolution", *Optics Letters*, Jun. 1, 2006, pp. 1633-1635, vol. 31, No. 11, Optical Society of America, USA.

Zinkl et al., "Pollen-Stigma Adhesion in Arabidopsis: A Species-Specific Interaction Mediated by Lipophilic Molecules in the Pollen Exine", *Development*, (1999), pp. 5431-5440, vol. 126, The Company of Biologists Limited, Great Britain.

* cited by examiner

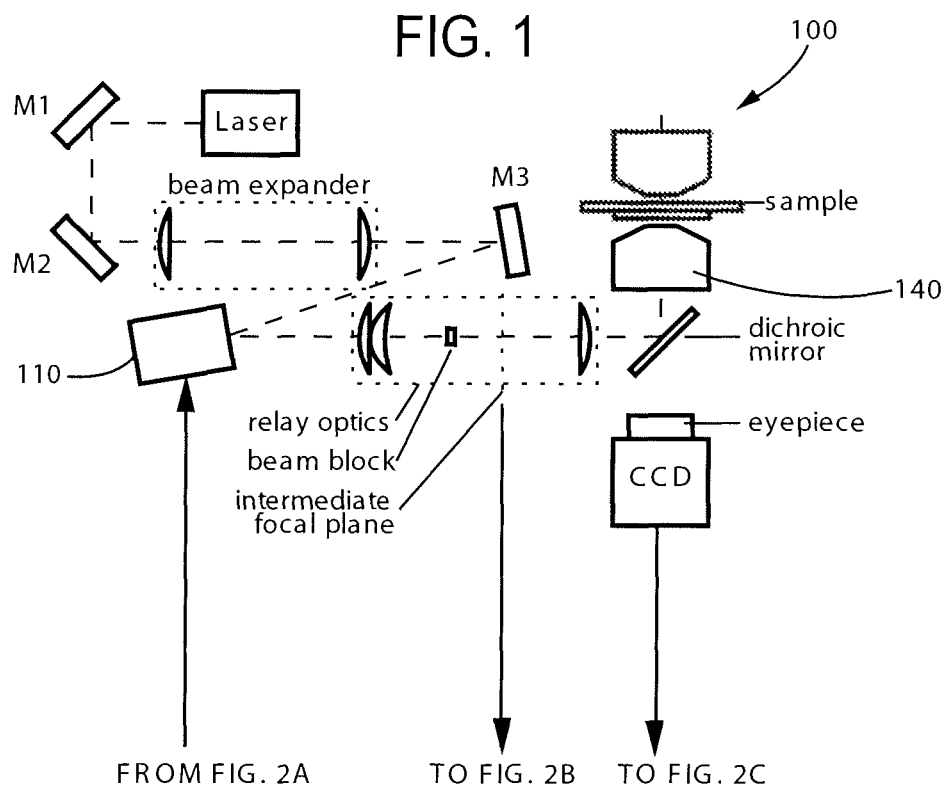

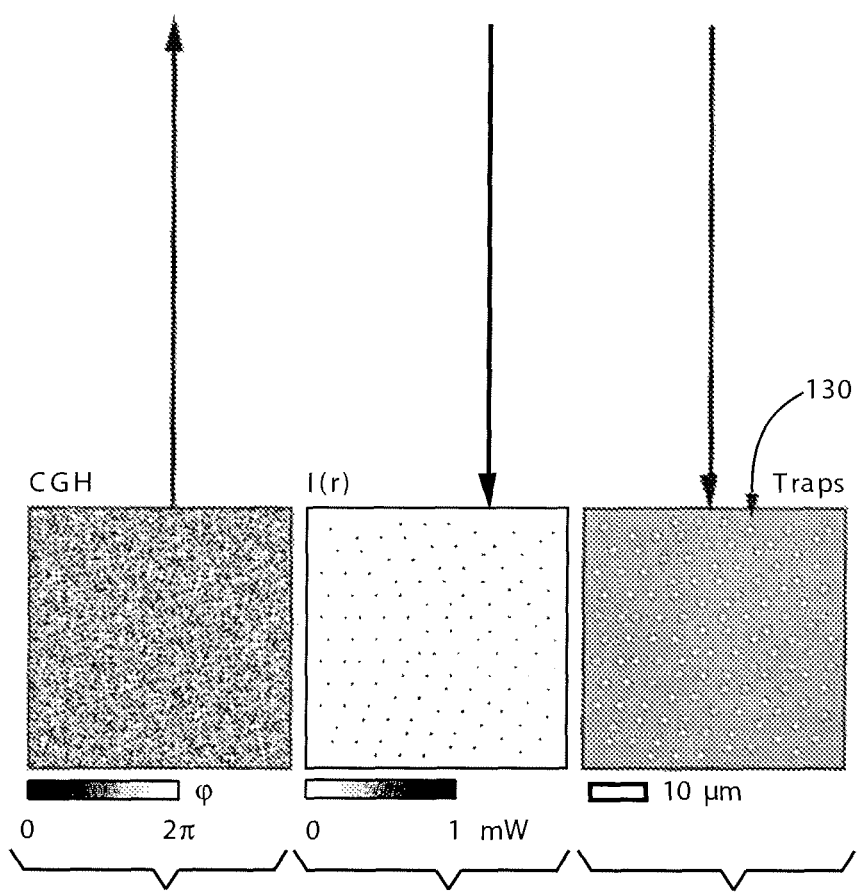

FIG. 3A
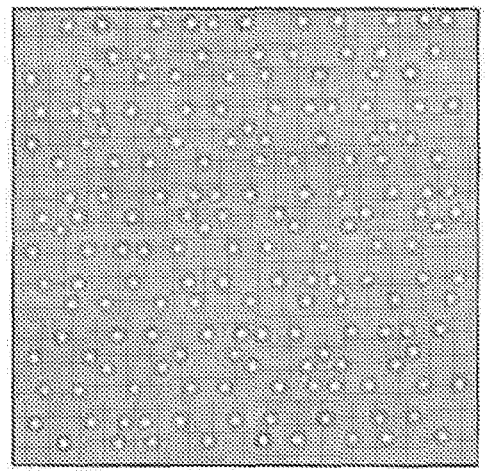
FIG. 3B
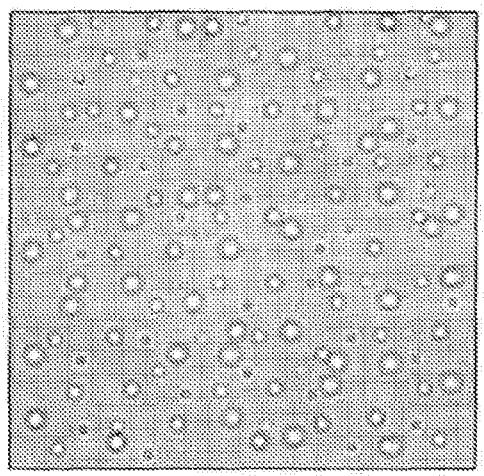
FIG. 3C -1
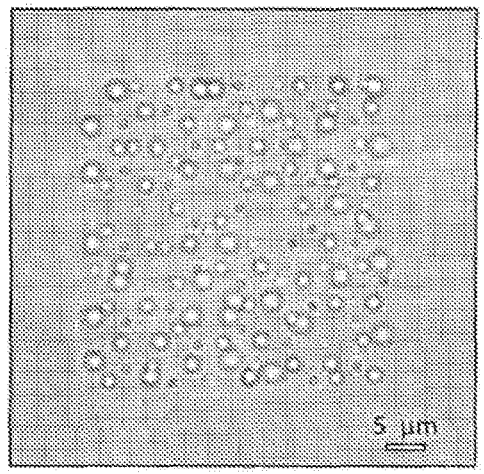
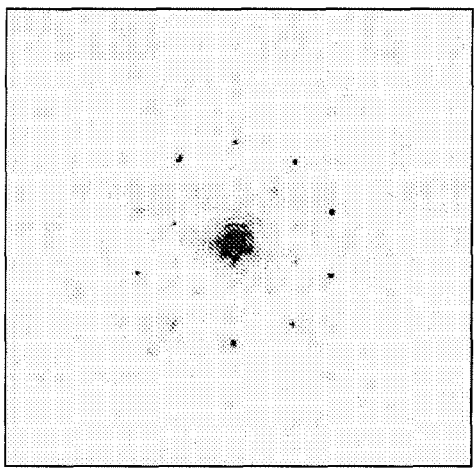
FIG. 3D
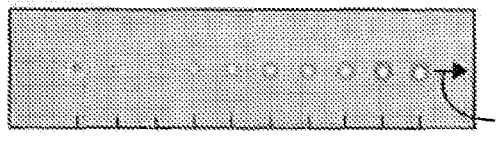
z [μm]
—145
0   4   8   12
FIG. 3C - 2

FIG. 4A
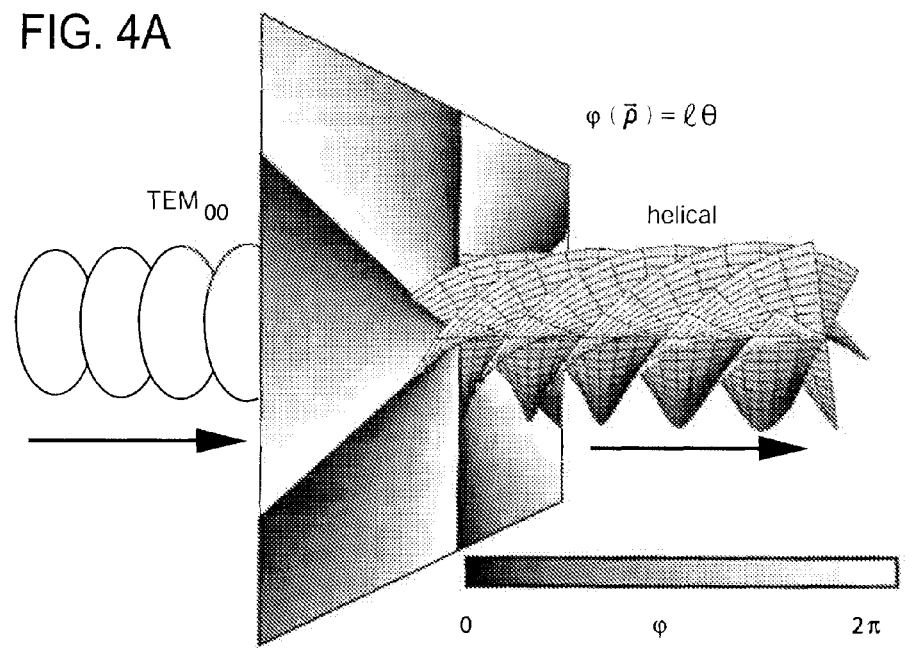
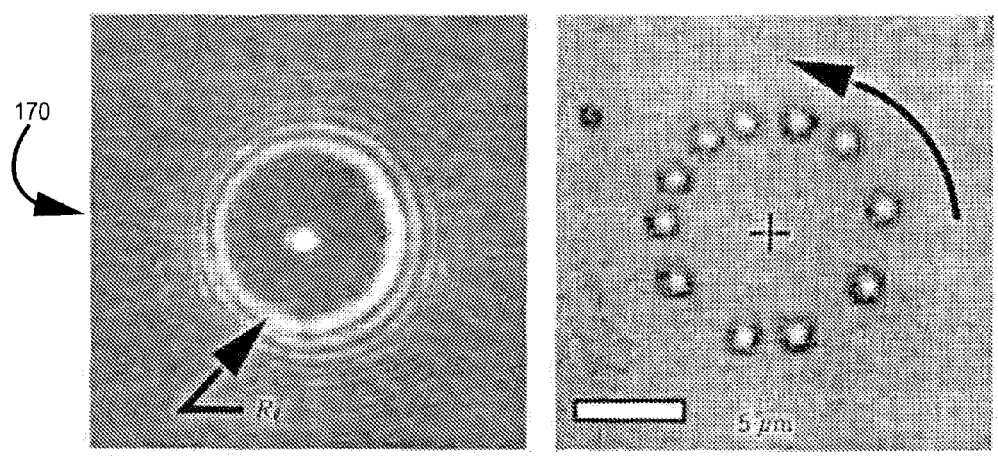
FIG. 4B    FIG. 4C

FIG. 5A-1
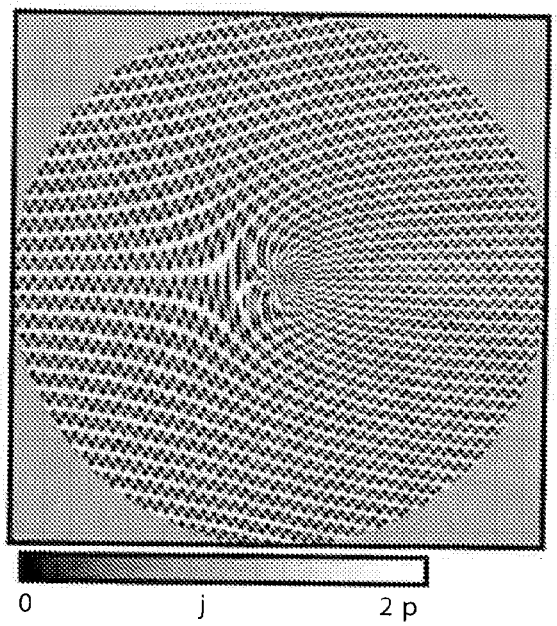
FIG. 5A-2
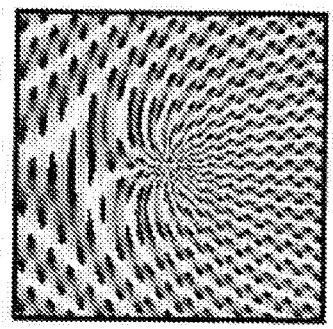
0   j   2p
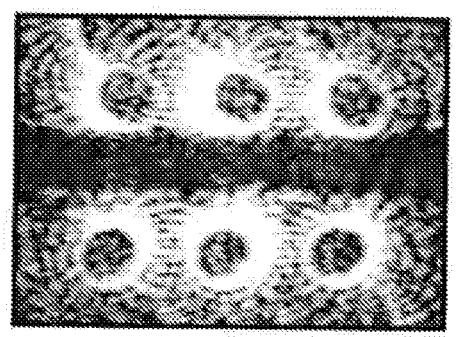
FIG. 5B
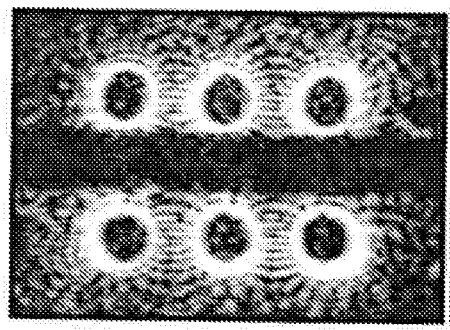
FIG. 5C
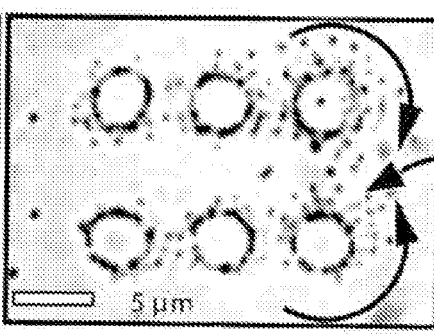
FIG. 5D

HOLOGRAPHIC MICROFABRICATION AND CHARACTERIZATION SYSTEM FOR SOFT MATTER AND BIOLOGICAL SYSTEMS

CROSS-REFERENCE TO RELATED PATENT APPLICATIONS

This application is a divisional application and claims priority to U.S. patent application Ser. No. 11/936,033, filed Nov. 6, 2007. U.S. patent application Ser. No. 11/936,033 claims the benefit under 35 USE 119(3) of U.S. Application No. 60/857,348, filed Nov. 7, 2006, both of which are incorporated herein by reference in their entirety.

The United States Government has certain rights in this invention pursuant to grants from the National Science Foundation by Grant Numbers DMR-0451589 and DBI-0629584.

This invention is directed to a fully integrated holographic microfabrication system and method. More particularly, the invention is directed to an optical system for assembling and dynamically controlling complex three dimensional structures from objects suspended in a fluid, the objects being, for example, colloidal particles, macromolecules, nanoclusters, nanowires and biological materials, such as cells. Such objects can be of any size and shape which are readily assembled and manipulated for a selected commercial purpose.

BACKGROUND OF THE INVENTION

The use of optical traps or tweezers has undergone substantial development over recent years. This technique can manipulate matter, including very small objects and small portions of larger objects, with great precision. Recent progress has resulted in the ability to create large arrangements of optical traps to perform simultaneously many tasks at various spatial locations. These traps can also be individually specified as to trapping strength, optical character and size, given the needs of the situation. In view of all these degrees of freedom, however, little has been accomplished in terms of complex commercial applications.

SUMMARY OF THE INVENTION

One Three dimensional assembly, micromanipulation and dynamic configuring of objects is accomplished by use of computer generated holograms which can trap objects, exert precision force at selected system locations and assemble complex arrangements of objects in any selected three dimensional configuration, including extensive stacks of objects. Collectively the assembly of optical traps can execute processing and manufacturing protocols for a wide variety of commercial purposes. This system can carry out such manufacturing steps as assembling three dimensional functional structures from various building blocks, such as microscopic fluid-borne objects (colloidal particles, e.g.), macromolecules, nanoclusters, nanowires and various biological media, such as biological cells. The system can carry out assembly, processing, testing and inspection of the assembled particle array or an object, execute chemical processing steps, as well as perform mechanical and optical processing using a selectable range of light wavelengths, including white light to perform these functions. Further, the system can be used as a sensor or probe for optical, electrical, chemical, biological and force gradient properties. In addition the system employs a holographically focused microscope with each image itself being a hologram, incorporating volumetric data and in effect is three dimensional versus conventional holographic microscopy where images are two dimensional.

Various aspects of the invention are described hereinafter, and these and other improvements are described in detail hereinafter, including the drawings described in the following section.

BRIEF DESCRIPTION OF THE DRAWINGS

FIG. 1 illustrates a schematic diagram of a holographic optical trapping system;

FIG. 2A illustrates a computer generated hologram (CGH); FIG. 2B illustrates a light array at an intermediate focal plane; and FIG. 2C illustrates a resulting optical trap array;

FIG. 3A illustrates an assembly of 173 colloidal silica spheres in a quasicrystal layer array; FIG. 3B illustrates the trapped particles translated into a desired three dimensional configuration; FIG. 3C shows reduction of the scale to create an optically dense material which can then be gelled; and FIG. 3D shows a laser diffraction pattern at 633 nm wavelength which shows 10 fold diffraction peaks;

FIG. 4A illustrates a helical phase mask transformation of a $TEM_{00}$ mode to a helical mode with winding number, l; FIG. 4B illustrates the helical mode focused to a ring of light of radius $R_e \propto l$ with l=30; and FIG. 4C shows a multiply exposed photograph of a single colloidal silica sphere dispersed in water and circulating around the optical vortex of FIG. 4B;

FIGS. 5A-1 and 5A-2 illustrate a phase holograph for encoding a microfluidic gear pump using counter-rotating optical vortices with topological charge $l_\pm=\pm30$; FIG. 5B illustrates the projected light pattern and processing with the holograph before adaptive optimization; FIG. 5C shows after adaptive optimization; and FIG. 5D shows an operating microfluidic pump filled with 700 nm diameter silica spheres and pumping water through a central channel at 5 μm Is;

DETAILED DESCRIPTION OF THE PREFERRED EMBODIMENTS

Figure 6:
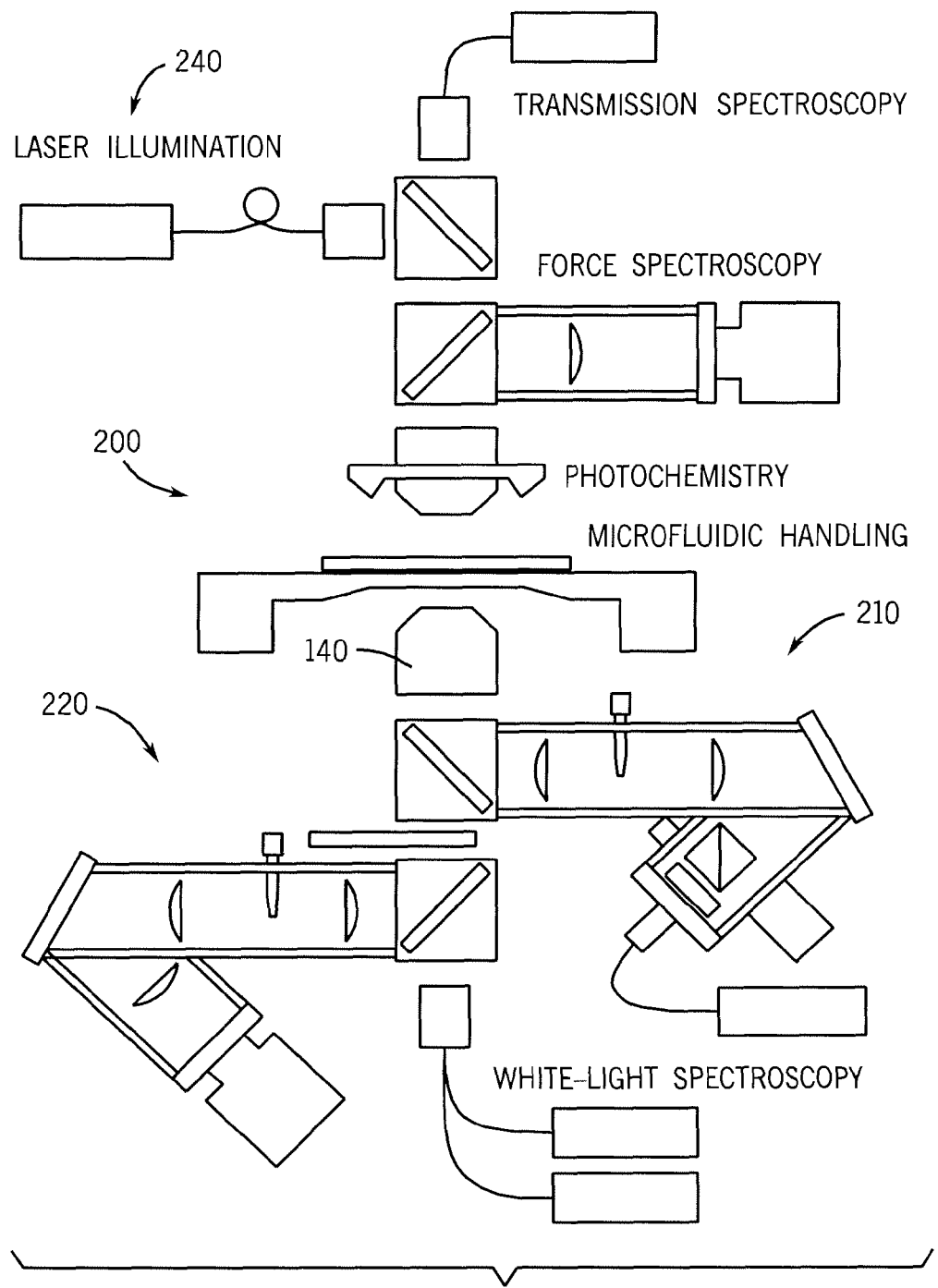
FIG. 6 shows a general system for optical processing.

A system constructed in accordance with an embodiment of the invention is shown generally at 100 in FIG. 1. The system 100 uses a computer-designed diffractive optical element (DOE) 110 to split a single collimated laser beam 120 into multiple independent beams, each of which subsequently is focused into an optical trap or tweezers 130 (see FIG. 2C) preferably by a strongly converging objective lens 140 in FIG. 1. The DOE 110 preferably takes the form of a spatial light modulator (SLM) to create a computer-generated hologram (CGH) as shown in FIG. 2A. This CGH creates a plurality of light beams 125 in FIG. 2B specifically designed to create a particular pattern of the optical tweezers 130 (see FIG. 2C). Projecting a sequence of computer-designed holograms with an SLM reconfigures the projected traps 130, thereby translating trapped particles or manipulating objects along selected independent paths. The optical tweezer 130 is created in a conventional manner by bringing an intense beam of light, such as the laser beam 120, to a diffraction-limited focus. The light's electric field polarizes nearby dielectric objects; and the induced dipoles are drawn up intensity gradients toward the focus. Radiation pressure due to absorption and surface scattering competes with this optical gradient force and tends to repel an optically trapped particle. Stable trapping is only possible if the gradient force dominates. For this reason, optical tweezer systems often are built around the microscope objective lens 140 (see FIG. 1) whose large numerical aperture and well-corrected aberrations optimize axial intensity gradients.

The optical trap 130 can be placed anywhere within the objective lens' focal volume by appropriately selecting the input beam's direction of propagation and degree of collimation. For example, a collimated beam 135 passing straight into an infinity-corrected form of the objective lens 140 comes to a focus in the center of the lens' focal plane, while another beam (not shown) entering at an angle comes to a focus proportionately off-center. A diverging beam focuses downstream of the focal plane and a converging beam focuses upstream. By the same token, multiple beams entering the lens' input pupil simultaneously form multiple ones of the optical trap 130 in the focal volume, each at a location determined by its degree of collimation angle of incidence.

Using the system 100 of FIG. 1, FIG. 3A shows 173 colloidal silica spheres arranged in a single plane within a three-dimensional sample volume. Comparable planar rearrangements also can be implemented with a conventional single rapidly scanned optical tweezer in a time-shared configuration. Unlike these other conventional techniques, however, holographic trapping also can create three-dimensional structures. The images in FIGS. 3B and 3C show the same spheres being reorganized into the third dimension, their images changing appearance as they move along an optical axis 145. Other three-dimensional optical trapping techniques, such as the generalized phase contrast (GPC) method require two-sided optical access and cannot stack objects along the optical axis 145. By contrast, the system 100 can stack micrometer-scale objects at least 12-14 deep along the optical axis 145.

In addition to arbitrary three-dimensional control, the holographic traps 130 offer other advantages over conventional scanned tweezers. HOT patterns have extensive degrees of freedom than time-shared arrays which must periodically release and retrieve each trapped object. Additionally, the lower peak intensities required for continuously illuminated traps are less damaging to photosensitive samples.

A laboratory-scale implementation of a dynamic form of the holographic optical tweezers 130 preferably used a Hamamatsu X8267 parallel-aligned nematic SLM for the DOE 110 to reshape the laser beam 120 from a frequency-doubled diode-pumped Nd:YVO$_4$ laser (Coherent Verdi) into a designated pattern of beams. Each is transferred to the entrance pupil of a 100× NA 1.4 oil immersion objective lens 140 mounted in a Nikon TE2000U inverted optical microscope 150 and then focused into the optical 130 trap. A dichroic mirror 160 reflects the laser beam 120 into the objective lens 140 while allowing images of the trapped particles to pass through to a video camera (not shown). When combined with a 0.63× widefield video eyepiece, this optical train offers a 86×65 µm$^2$ field of view, with a magnification of 135 nm per pixel at the video camera.

The collimated laser beam 120 initially has planar wavefronts with a uniform phase profile $\phi(\vec{\rho})=0$. The DOE 110 imprints them with the phase profile $\phi(\vec{\rho})$ at each 40 µm wide pixel in a 768×768 array. The DOE's calibrated phase transfer function imparts one hundred fifty distinct phase shifts ranging from 0 to 2π at the operating wavelength of λ=532 nm. The phase shift imposed at each pixel is specified through a computer interface with an effective refresh rate of 2 Hz for the entire array. Despite the DOE's inherently limited spatial bandwidth, it can project such sophisticated trapping patterns as illustrated by considering FIGS. 2A-2C and 3A-3D.

Three-dimensional control is attained by integrating the objective lens' phase $$\varphi_z(\vec{\rho}) = \pi \frac{\rho^2 z}{\lambda f^2}, \tag{1}$$

profile, into the phase hologram, $\phi(\vec{\rho})$, encoding an array of the optical traps 130. This translates the optical trap 130 by z along the optical axis 145 (see bottom edge view of FIG. 3C-2 taken from FIG. 3C-1). Here f the focal length of the objective lens 140. The algorithms we have developed for computing trap-forming phase holograms can separately specify $\phi(\vec{\rho})$ for each trap-forming beam, thereby allowing each of the optical traps 130 to move independently with respect to the focal plane.

Engineering the individual traps' wavefronts imparts additional functionality. For example, the helical phase profile $$\phi_l(\vec{\rho}) = l\theta \bmod 2\pi \tag{2}$$

converts an ordinary Gaussian laser beam into a helical mode, and its corresponding optical tweezer into a so-called optical vortex. Here θ is the polar coordinate in the DOE plane, and the integer 1 describes the helical wavefront pitch and is known as the topological charge. Destructive interference along the helical screw dislocation cancels the beam's intensity along its axis all the way to the focus. As shown in FIG. 4B, optical vortices 170 thus focus to bright rings of light, rather than points. The image in FIG. 4B was obtained by placing a mirror (not shown) in the microscope's focal plane and collecting the reflected light with the conventional imaging train. These dark form of the optical tweezers 130 have proved useful for trapping objects that are not compatible with conventional optical tweezers 130, including ultra-high-index particles for photonic applications (such as assembling the icosahedral quasicrystal of FIGS. 3A-3C). These optical tweezers 130 also can trap reflecting, absorbing and low-index particles that are useful for biomedical applications.

Combining $\phi_l(\vec{\rho})$ with a phase hologram encoding an array of the optical tweezers 130 yields an array of optical vortices 170 (see FIGS. 5A-1, 5A-2 and 5D). Our algorithms for computing phase-only holograms also can imprint vortex-forming helical phase fronts onto individual traps ones of the optical 130 in an array, creating mixed patterns with different winding numbers, such as the array shown in FIG. 5B-5D.

Because of their helical phase profile, the optical vortices 170 carry orbital angular momentum, independent of polarization, that they can transfer to trapped materials. The resulting torque can drive trapped objects around the trap's circumference, as shown in FIG. 5D. The optical vortices 170 are useful, therefore, for creating motion at small length scales, for example in rotating semiconductor nanowires during assembly. Arrays of the optical vortices 170 can act as pumps and mixers, which also are useful for preparing and processing materials for characterization and assembly. A typical pump is shown operating in FIG. 5D. The optical vortices 170 can further act as conveyor belts for a manufacturing operation.

Holographic wavefront engineering lends itself to other advantageous applications, with virtually any mode of light having potential applications. For example, the axicon phase profile $\phi_\gamma(\vec{\rho})=\gamma\rho$ creates an approximation of a Bessel mode which focuses to an axial line trap whose length is controlled by $\gamma$. Arrays of Bessel beam line optical traps can pass through quite deep microfluidic channels and thus improve optical fractionation of fluid-borne samples.

All of these trapping capabilities are controlled by the phase profile imprinted on the input laser beam 120 by the DOE 110 (preferably the spatial light modulator). Thus, they can be selected and changed in real time under computer control, without requiring any hardware modifications. A single computer-designed phase hologram can project distinct patterns of the optical traps 130 in multiple wavelengths of laser light. Multi-color trapping and photochemical processing is very useful for assembling multi-component tissues, materials and devices.

FIG. 6 illustrates a system 200 which includes modular subsystems that comprise the proposed integrated fabrication and characterization system. Included in the system 200 can be holographic trapping subsystem 210 and holographic microscopy subsystem 220. The primary assembly system 200 and the subsystems 210, 220 can be supported by various spectroscopy components in both transmission and reflection, and an advantageous form of force spectroscopy.

Rapid and precise fabrication of photosensitive materials requires appropriate choice of wavelength. Earlier holographic trapping systems have been based on high-powered visible lasers, both for their ease of use, and also for their comparatively high trapping efficiency for micrometer-scale objects. Longer wavelength lasers are less likely to damage biological materials, however, and can be more effective for trapping semiconductor nanowires and related nanomaterials.

In the subsystem 210 of FIG. 6, recent advances in commercial fiber lasers make these a particularly attractive class of infrared sources for trapping applications. The subsystem 210 preferably uses an IPG YLD-10-LP linearly polarized single-mode continuous wave fiber laser 240 operating at 1075 nm. This laser 240 provides up to 10 W, which can power up to 2000 independent traps. The laser beam 250 can be expanded to 5 mm diameter using a standard fiber-coupled beam expander (IPG) to illuminate the DOE 110 (preferably a spatial light modulator).

A preferred embodiment of the holographic optical trapping subsystem 210 projects the optical traps 130 using a Holoeye HEO-1080p liquid crystal on silicon (LCoS) SLM tuned to provide $2\pi$ phase shift at the proposed laser wavelength. This SLM (a preferred form of the DOE 110) comprises an array of 1920×1080 phase pixels, each 8 μm across. In selecting a suitable SLM for a given application, several optimization criteria may be considered. For example, larger numbers of phase pixels, higher rates of phase pattern changes and finer resolution of phase modulation al improves the performance of the holographic optical trapping subsystem. Smaller phase pixels allow for more compact design of the holographic optical trapping subsystem 210.

In a most preferred embodiment, trapping and imaging will be based on a choice of Nikon CFI Plan Apo 100× and 60× oil immersion IR objective lenses 140. These lenses 140 have proved excellent for optical trapping both because of their high numerical aperture (NA 1.4), and also because of their excellent aberration correction. The IR variants of these lenses 140 are designed for operation at infrared and visible wavelengths.

Figure 7:
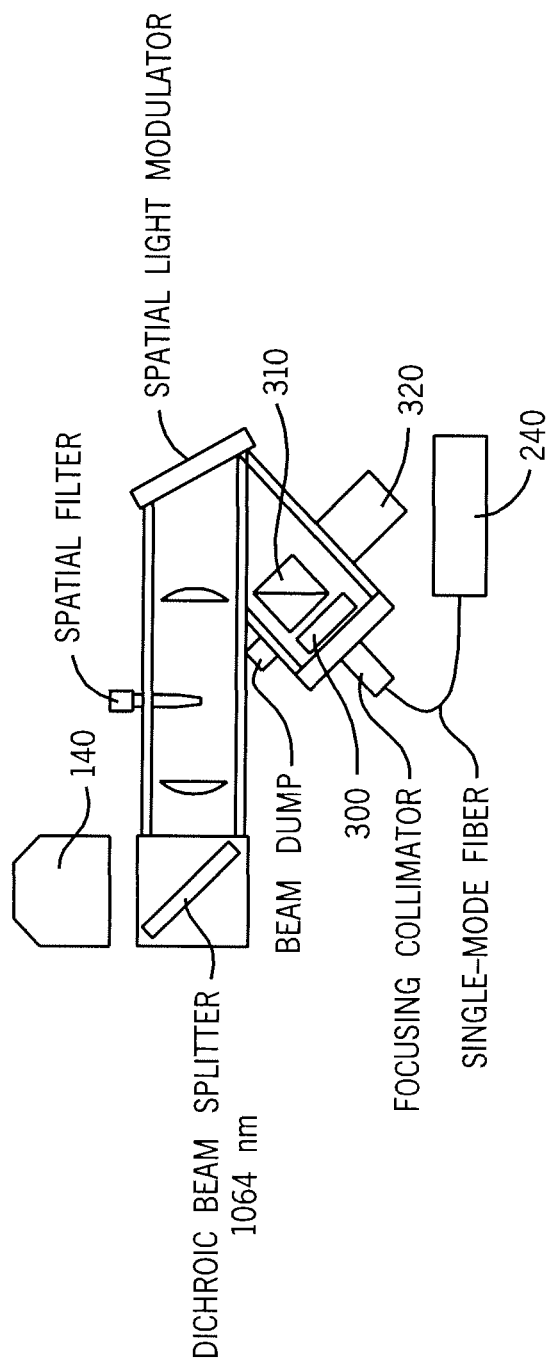
FIG. 7 shows a holographic optical trapping module.

In a preferred embodiment shown in FIG. 7, laser power will be fine tuned with a half-wave plate 300 in a precision rotation mount and a polarizing beam splitter 310. This also will improve diffraction efficiency by improving the beam's polarization. The beam splitter 310 also provides a port for a second laser 320 at a different wavelength, useful for multi-color holographic trapping.

The role of the relay optics is to project an appropriately scaled image of the DOE 110 face onto the input pupil of the objective lens 140. The field and depth of view for the trapping system then is set by the number of pixels spanning the projected aperture. With the 60× objective lens 140, the proposed system 200 will be able to place traps at arbitrary locations over a 120 μm×120 μm area and at ±50 μm with respect to the focal plane. Three-dimensional placement resolution is roughly 30 nm, and deliberately exploiting high-order diffraction will allow us to extend this range by nearly a factor of two, with limitations set by reduced diffraction efficiency.

Figure 8:
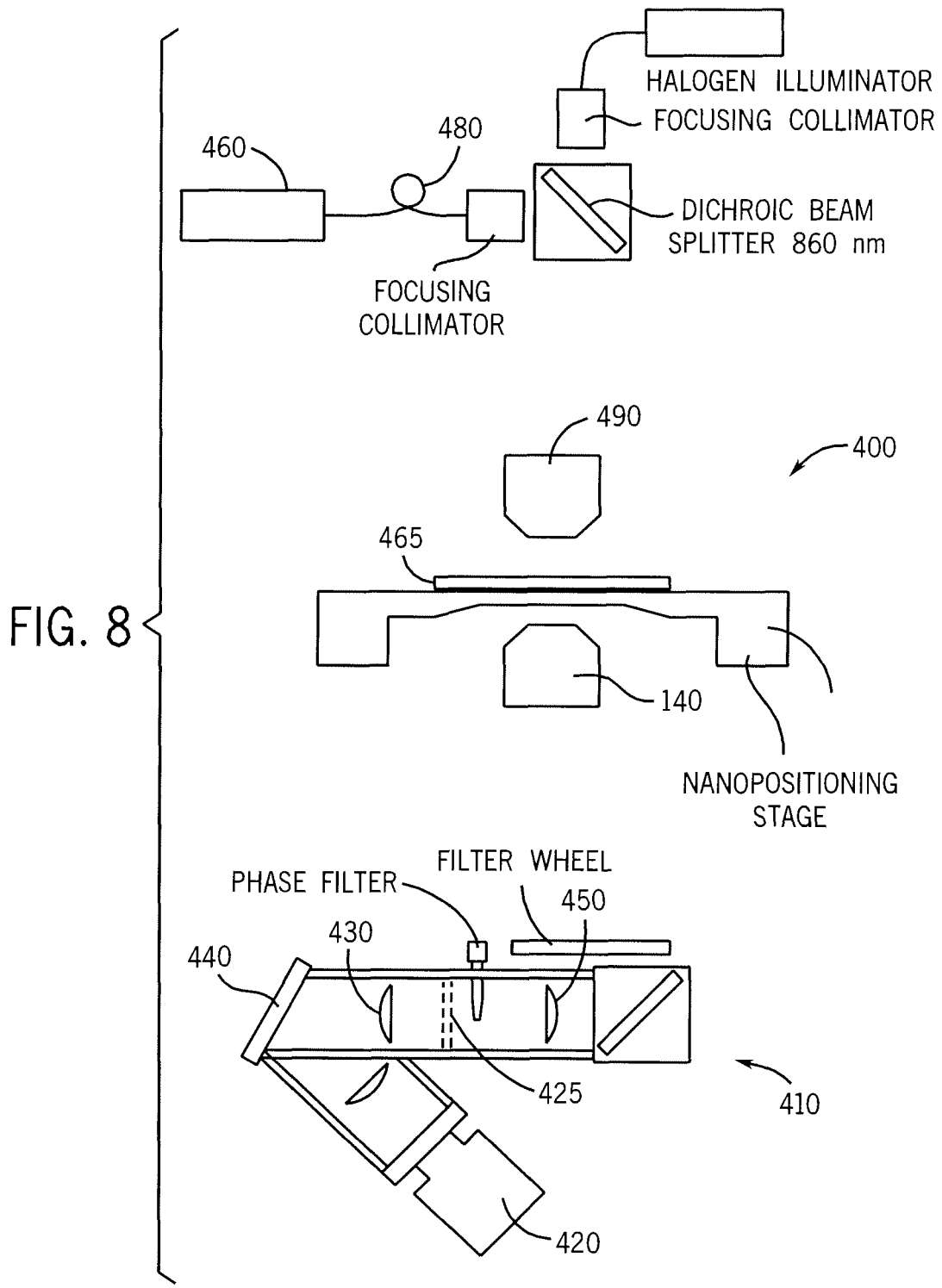
FIG. 8 shows a holographic 3D imaging module.

As shown in FIG. 8, the optical train 400 that projects the holographic traps 130 is readily modified to work as an imaging system 410. As shown schematically in FIG. 8, light gathered by the objective lens 140 is projected onto a video camera 420 by a relay lens 430 whose transfer function is controlled by a second phase-only spatial light modulator 440. The two physical relay lenses 430, 450 are arranged as a standard 4f telescope, transferring the wavefronts of light emerging from the objective lens' pupil to the face of the SLM 440. A virtual lens $\phi_z(\rho)$, encoded on the SLM 440 then selects the desired focal plane.

In the simplest implementation, the imaging train is focused to a plane at height z above the objective's focal plane by imprinting the same phase pattern, (see Eq. (1) used to displace the optical trap 130). In this case, the imaging plane can be effectively scanned through a three-dimensional sample without physically moving the sample relative to the objective lens 140. The focusing hologram also can be used to adaptively correct for geometric aberrations in the imaging train.

Employing the same class of the SLM 440 for imaging and trapping ensures that the field of view and depth of focus for imaging will cover the same range as the trapping system. This SLM's updates will be synchronized to the video camera 420 to gather volumetric data at video rates.

Images are most preferably acquired with a Roper Cascade 512B electron-multiplied charge-coupled device (EMCCD) camera. This camera 420 incorporates field-effect amplifiers at each pixel so that it can offer both low-light level imaging and also extremely low-noise bright-field imaging. It also offers flexible triggering and electronic shuttering, as well as adjustable resolution and frame rate. Low-noise operation is particularly useful for particle tracking and deconvolution microscopy, whose accuracy degrades rapidly with decreasing signal-to-noise ratio.

Unwanted diffraction orders due to the SLM's pixellated structure can be eliminated with an appropriate set of pupils mounted with the ocular lens (not shown). Additionally, a small beam block 425 (shown in phantom in FIG. 8) introduced into the relay lens' intermediate focal plane can be used to convert the optical train to dark-field operation. Other amplitude- and phase-modifying elements introduced in this plane will provide additional modes of operation, including variants of phase-contrast microscopy.

Commercially available SLMs 440 impose different degrees of phase modulation on light of different wavelengths. This means that the holographically focused system 410 would suffer from chromatic aberration were it used with white light illumination. This is a principal reason for replacing standard microscope illumination with a monochromatic source for bright-field and dark-field imaging. The system 440 preferably is based on a 200 mW fiber-coupled laser diode 460, operating at 860 nm by SDL, Inc. Bending fiber 470 to scramble the wavefront yields uniform speckle-free illumination. The laser diode 460 also can be rapidly gated for short exposures and multiple stroboscopic exposures.

The fiber-coupled laser 460 can be collimated with a commercial fiber collimator 480 and focused onto sample 465 with a second 60× objective lens mounted as a condenser. The beam will be reflected into the condenser 490 preferably using a dielectric multilayer mirror (Chroma Technology) mounted at 45°, thereby providing additional optical access to the condenser 490 at other wavelengths. In particular, this arrangement will provide access for a standard white light illuminator, which can be convenient for some applications. In this case, the SLM 440 will likely not play an active role, and the imaging system 410 will produce standard two-dimensional images.

Volumetric image reconstruction can best be performed using standard algorithms of deconvolution microscopy implemented in the IDL programming language. Simple deblurring operations with the nearest-neighbor algorithm can proceed in near-real time on a standard workstation. This will be ideal for on-line inspection of systems being assembled through holographic trapping. More accurate reconstructions will proceed either with myopic deconvolution or with constrained maximum entropy algorithms, depending on the nature of the sample. These more computationally intensive algorithms are useful for quantitative structural measurements on finished objects.

The condenser and illumination system 410 can be mounted on a spring-loaded rack-and-pinion translation stage both to facilitate Köhler alignment and also to provide access to samples.

The samples 465 can be mounted on an integrated translation stage with three-axis control. Coarse focusing is performed with a precision spring-loaded rack-and-pinion drive to minimize drift. Precise computer-controlled focusing and lateral translation can be performed with a conventional Mad City Labs Nano-View LP200, which combines stepping-motor two-axis coarse translators with piezoelectric three-axis controllers. The fine controllers offer 200 µm range in each axis with 0.4 nm resolution and better than 1 nm repeatability.

Figure 9:
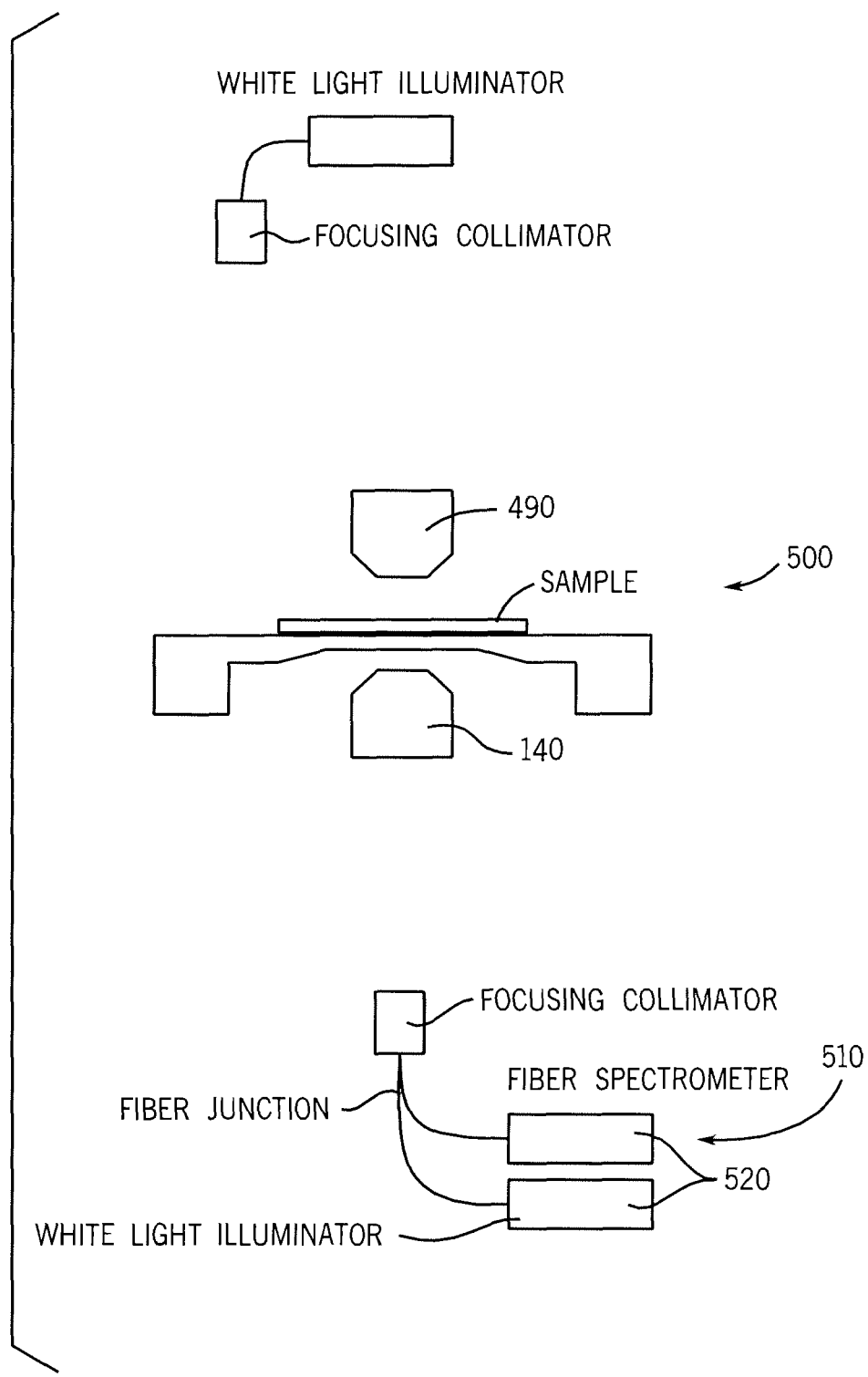
FIG. 9 shows a white light based optical processing system.

A major application area for the proposed fabrication instrument is in holographic assembly of photonic materials and devices. Another involves organization and monitoring of living biological samples. Consequently, a preferred system 500 shown in FIG. 9 incorporates a fiber spectrometer 510 and a pair of white light sources 520 to provide transmission and reflection spectra in real time. Spectroscopic information then can be used to fine tune structures before they are permanently set in place. It also can be used to assess trapped cells' viability and their response to external stimuli. For optoelectronic applications, the spectroscopy subsystem 530 can be used to analyze samples' fluorescence when exposed to the trapping laser. Some semiconductor nanowires are observed to fluoresce brightly when trapped, and this fluorescence can be useful for selecting nanowires for assembly.

The spectroscopy subsystem 500 most preferably includes an Ocean Optics USB4000 fiber optic spectrometer, which offers better than 4 nm wavelength resolution over the range 300 to 1000 nm. Some regions in this wavelength range will be suppressed by the transmission characteristics of the dielectric multilayer mirrors used in the holographic trapping and imaging train. Mounting the spectrometer's input coupler below the microscope permits simultaneous holographic trapping, three-dimensional imaging and real-time spectroscopy, however. This type of coordination is essential for creating precise photonic structures under interactive control and also will be useful for characterizing biological systems during optical micromanipulation. The loss of sensitivity in selected wavelength ranges, therefore, is compensated by the additional functionality. Two Ocean Optics R-LS-1-LL rack-mounted halogen light sources will provide broad-band illumination for transmission and reflection spectroscopy. The entire system can be calibrated with standard samples.

In another form of the invention, multi-point force spectroscopy and manipulation can be performed using a calibrated arrangement of optical tweezers' potential energy wells. An object's instantaneous displacement from the trap's equilibrium point can be used to measure the instantaneous force making it move. Most effectively, the potential energy well of a single one of the optical tweezers 130 can be calibrated by tracking the thermally driven motions of a trapped particle. This general approach avoids the necessity of characterizing and calibrating an externally applied reference force. Statistically optimal methods can be used for analyzing trajectories of optically trapped particles to obtain time-resolved measurements of the forces on multiple holographically trapped particles simultaneously. These methods can be applied also to video microscopy data obtained in the proposed system. Imaging measurements of forces, however, only work when the trapped particles' displacements are large enough and slow enough to track with a video camera. They also require accurate calibrations for each one of the optical traps 130.

Light scattered out of the optical trap or tweezer 130 by a trapped particle interferes with the unscattered portion of the beam to yield an interference pattern in the far-field forward-scattering direction. This interference transforms small particle motions into large intensity variations. Measuring these variations with a quadrant photodiode records the particle's displacement with sub-nanometer resolution over a bandwidth of tens of kilohertz. Once translated into equivalent forces, this technique can attain attonewton force resolution and can measure forces as large as several piconewtons. These specifications greatly exceed what is possible through imaging-based measurements.

It is noted that an alternative technique has been developed that relaxes the requirement to calibrate the optical tweezer 130 for force measurements and also is amenable to parallelization. In a further embodiment of the invention, the trapped particle deflects the trapping beam by an amount that depends on its displacement from the center of the trap. The beam's mean deflection corresponds to an average change in momentum imparted to the trap's photons by the particle, and thus to a force when normalized by the flux of photons in the beam. The effective force deflecting the beam equals the force displacing the particle by Newton's third law. A single calibration of the trapping beam's intensity and the imaging train's magnification therefore calibrates the force transducer, independent of the optical tweezer's trapping characteristics.

Figure 10:
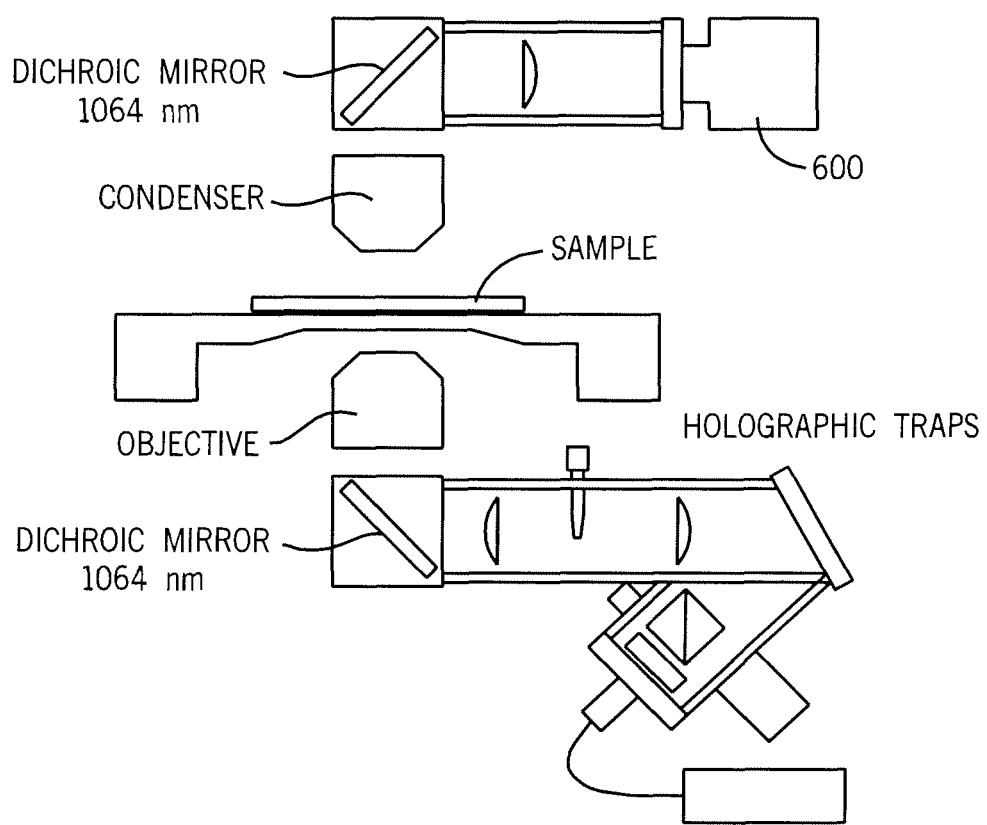
FIG. 10 shows a multipoint force monitoring/processing module.

An individual trapping beam's displacement can therefore be measured by imaging the far-field scattering pattern through the condenser in a plane intermediate between the objective's front and back focal planes. Thus, optical deflection force spectroscopy can be applied to multiple optical traps 130 simultaneously, provided that the traps' images are resolved in the intermediate plane. The individual traps' deflections can be measured with sufficient precision with a conventional video camera 600 (see FIG. 10) to provide sub-femtonewton resolution over a ten piconewton range at a bandwidth limited by the camera's frame rate. The benefit over previously described approaches is that holographic trapping force spectroscopy provides information from a large number of traps simultaneously. The implementation then uses the video camera 600, protected with neutral density filters to detect the holographic traps' forward scattered beams 610. The camera 600 is focused with a tube lens 620 to optimize the trade-off between force resolution and spatial resolution. Output from the camera 600 will be digitized and analyzed with a conventional analysis software of the Applicant.

In yet another aspect of the invention, raw materials can be introduced to the optical fabrication system and finished products removed using microfluidic sample handling. Pioneered with conventional microlithography, microfluidics systems have since been implemented in polymeric materials with soft lithographic techniques that permit rapid prototyping at extremely low costs. Polymer-based microfluidic systems also permit integration of microscopic pumps and valves. Pulsating flows from such pumps can be compensated by phase-locked modulation in laser intensity to maintain optimal conditions for optical fractionation. Integrated microfluidic systems also are compatible with electrokinetic driving technologies developed for capillary electrophoresis.

In still another embodiment of the invention, a single optical processing instrument can be combined with a large number of distinct microfluidic chips to generate a range of different optical fabrication and fractionation applications, such as manufacturing microfluidic chips through soft lithography in polydimethysiloxane (PDMS).

Another embodiment of the invention enables manufacture and quality assurance in fabricating three-dimensional structures out of dielectric building blocks. One application is to assemble and characterize three-dimensional photonic bandgap materials. These "semiconductors for light" have been demonstrated for radio and microwave wavelengths using macroscopic assembly techniques, and have been demonstrated for visible wavelengths in one and two dimensional lithographically defined microstructures. Processing high-index materials into three-dimensional photonic bandgap microstructures for optical applications has proved challenging. Creating appropriate small-scale structures with the proposed optical fabrication instrument therefore would open up new avenues for research and development in photonics as well as in biomolecular spectroscopy.

Very recently, icosahedral quasicrystals have been identified as the best candidate structure for achieving three-dimensional photonic bandgaps. These pose even greater challenges to conventional fabrication techniques than periodic structures. These structures can be holographically assembled and typical results appear in FIG. 2C. These colloidal quasicrystals were assembled from silica spheres and then gelled into solid structures by photopolymerizing the surrounding fluid medium.

We also can use the optical fabrication and characterization instrument to organize ultra-high-index titania spheres into comparable permanent structures, and to measure their transmission and reflection spectra at optical wavelengths. Three-dimensional holographic microscopy will be particularly important for guiding and assessing the assembly process. Bulk photopolymerization of prototype structures can take advantage of ultraviolet light-emitting diodes (LED's) arranged as a ring illuminator around the condenser lens. Properties of the gel can be assessed with force spectroscopy on the spheres themselves.

In yet another application of the invention the optical tweezers 130 can manipulate and process semiconductor nanowires into three-dimensional structures to enable creating electronic and optoelectronic devices from chemically nanostructured materials. Heretofore, nanowire devices were created by randomly depositing the wires onto substrates and then defining functional structures through painstaking lithographic techniques. Now, devices can be assembled to order and use the systems described herein to build functional devices out of silicon nanowires, with a particular emphasis on sensor applications for biological and environmental monitoring.

In yet another embodiment, infrared holographic trapping is useful for manipulating living biological cells. Holographic trapping, in particular, is useful for arranging multiple disparate cells into specific three-dimensional configurations. This kind of structuring is crucial for the proper growth and development of cells in living tissues. Optically organized cellular assemblies have been demonstrated in model systems, including hepatocytes as a liver progenitor and islet cells for creating pancreatic implants. The three-dimensional cellular assemblies are transformed into artificial tissues by synthesizing a biodegradable gel around them.

Holographic trapping coupled with holographic microscopy within microfluidic environments will greatly facilitate and accelerate the optical assembly of artificial tissues. For example, the systems herein can be used to organize chondrocytes and osteoblasts into three-dimensional models for developing teeth, with the intention of creating transplantable artificial dentin.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of micromanipulating a plurality of particles of any shape, comprising:
   providing a source of light;
   providing a diffractive optical element;
   processing the light using the diffractive optical element to create a plurality of optical traps, each of the optical traps having an associated potential energy well;
   calibrating each of the plurality of the optical traps by an internal measure of forces characterizing the associated potential energy well of each of the optical traps, thereby providing time resolved information on forces imparted to the plurality of particles;
   further processing the light with optical components to produce alternate forms of the plurality of the optical traps; and
   applying the alternate forms of the plurality of the optical traps to perform a force calibrated micromanipulation of at least one object of any shape for a selected commercial purpose.

2. The method as defined in claim 1 further including the commercial steps of using a dark form of the plurality of the optical traps to trap the particles which are incompatible with conventional optical traps.

3. The method as defined in claim 1 wherein the step of calibrating comprises tracking thermally driven motion of a trapped one of the plurality of particles.

4. The method as defined in claim 1 further including at least one additional subsystem comprised of a holographic microscopy subsystem wherein the subsystem performs a step of forming a plurality of images and incorporating volumetric data in each of the plurality of images.

5. The method as defined in claim 3 wherein the step of tracking thermally driven motion comprises a step of statistically analyzing trajectories of the optically trapped particles.

6. The method as defined in claim 1 wherein the calibrating step includes measuring an interference pattern created from interacting an unscattered portion of a beam of the light with a portion of the light scattered out of each of the plurality of the optical traps, thereby measuring motion of each of the particles in the associated potential energy well of the optical trap, thereby determining the time resolved information on the forces imparted to the plurality of the particles.

7. The method as defined in claim 1 further including providing an objective lens and a condenser lens and wherein the step of calibrating the optical traps includes the step of resolving images of each of the plurality of optical traps projected through the condenser in a plane intermediate a front and back plane of the objective lens.

8. The method as defined in claim 1 wherein the alternate forms of the plurality of the optical traps comprises an axicon phase profile enabling the additional step of forming Bessel beam line optical traps which pass deeply into microfluidic channels which are part of an optical fractionation system.

9. The method as defined in claim 1 wherein the alternate forms of the plurality of the optical traps is applied in a step comprising the projecting of patterns of the plurality of the optical traps in multiple color wavelengths of the light, thereby enabling multi-color trapping and photochemical processing steps.

10. The method as defined in claim 1 wherein the alternate forms of the plurality of the optical traps are selected from the group of a dark form of the plurality of the optical traps for trapping the particles incompatible with conventional optical traps, optical vortices with different helical winding numbers for selectively applying rotational motion to the particles and the plurality of the optical traps with the alternate forms of the plurality of the optical traps imprinted thereon for creating various dimensional shapes for the micromanipulation of the particles.

11. The method as defined in claim 1, wherein the step of performing micromanipulation includes fabricating three-dimensional structures from dielectric building blocks.

12. The method as defined in claim 1, wherein the step of performing micromanipulation includes at least one of assembling and characterizing a three-dimensional photonic band gap material.

13. The method as defined in claim 1, wherein the step of performing micromanipulation includes at least one of assembling and characterizing a semiconductor for electromagnetic wave processing and output.

14. The method as defined in claim 13 wherein the electromagnetic wave is selected from visible, radio and microwave wavelengths.

15. The method as defined in claim 1, wherein the step of performing micromanipulation includes processing a high refractive index materials into three-dimensional photonic band gap microstructures.

16. The method as defined in claim 15 wherein the high respective index material has a refractive index at least as high as titania.

17. The method as defined in claim 1, wherein the step of performing micromanipulation includes processing and organizing titania particles into a permanent structure for commercial use.

18. The method as defined in claim 1, wherein the step of performing micromanipulation includes assembling icosahedral quasicrystals for forming three-dimensional photonic band gap materials.

19. The method as defined in claim 1, wherein the step of performing micromanipulation includes assembling colloidal quasicrystals and gelling the quasicrystals into solid structures by photopolymerising a surrounding fluid medium.

20. The method as defined in claim 19 where the photopolymerising step comprises using ultraviolet LEDs to apply ultraviolet light.

\* \* \* \* \*